United States Patent [19]
*Pandorf et al.

[11] Patent Number: 5,808,206
[45] Date of Patent: Sep. 15, 1998

[54] HEATED PRESSURE TRANSDUCER ASSEMBLY

[75] Inventors: Robert C. Pandorf, Newton Highlands; Paul W. Navarro, Melrose, both of Mass.

[73] Assignee: MKS Instruments, Inc., Andover, Mass.

[*] Notice: The term of this patent shall not extend beyond the expiration date of Pat. No. 5,625,152.

[21] Appl. No.: 679,952

[22] Filed: Jul. 15, 1996

Related U.S. Application Data

[63] Continuation-in-part of Ser. No. 585,535, Jan. 16, 1996, Pat. No. 5,625,152.

[51] Int. Cl.$^6$ .............................. G01L 7/00; G01L 9/12
[52] U.S. Cl. .............................................. 73/756; 73/724
[58] Field of Search .................... 73/700, 715, 723–728, 73/753, 756

[56] References Cited

U.S. PATENT DOCUMENTS

| | | |
|---|---|---|
| 3,018,016 | 1/1962 | Hnilicka ................................ 220/10 |
| 4,084,439 | 4/1978 | Teter et al. . |
| 4,176,557 | 12/1979 | Johnston . |
| 4,738,276 | 4/1988 | Adams . |
| 5,050,241 | 9/1991 | Flowers et al. ................................ 2/81 |
| 5,271,277 | 12/1993 | Pandorf . |
| 5,625,152 | 4/1997 | Pandorf et al. ............................ 73/756 |

OTHER PUBLICATIONS

Freudenberg Nonwovens Limited Partnership *A Guide to the Use and Selection of Surfacing Veils in Reinforced Plastics Applications* (Brochure).

Primary Examiner—George M. Dombroske
Assistant Examiner—Joseph L. Felber
Attorney, Agent, or Firm—Lappin & Kusmer LLP

[57] ABSTRACT

The disclosed pressure transducer assembly includes an external enclosure, a thermal shell disposed within the external enclosure, and a pressure sensor disposed within the thermal shell. The pressure sensor senses the gas or vapor pressure present in a tube coupling the sensor to a source of pressurized gas or vapor. The assembly includes a device for heating the thermal shell, and thermal insulation is disposed between the thermal shell and the external enclosure. The thermal insulation includes a plurality of metalized high temperature films stacked one on top of another and a plurality of spacer layers, each of the spacer layers being disposed between adjacent ones of the metalized high temperature films.

25 Claims, 11 Drawing Sheets

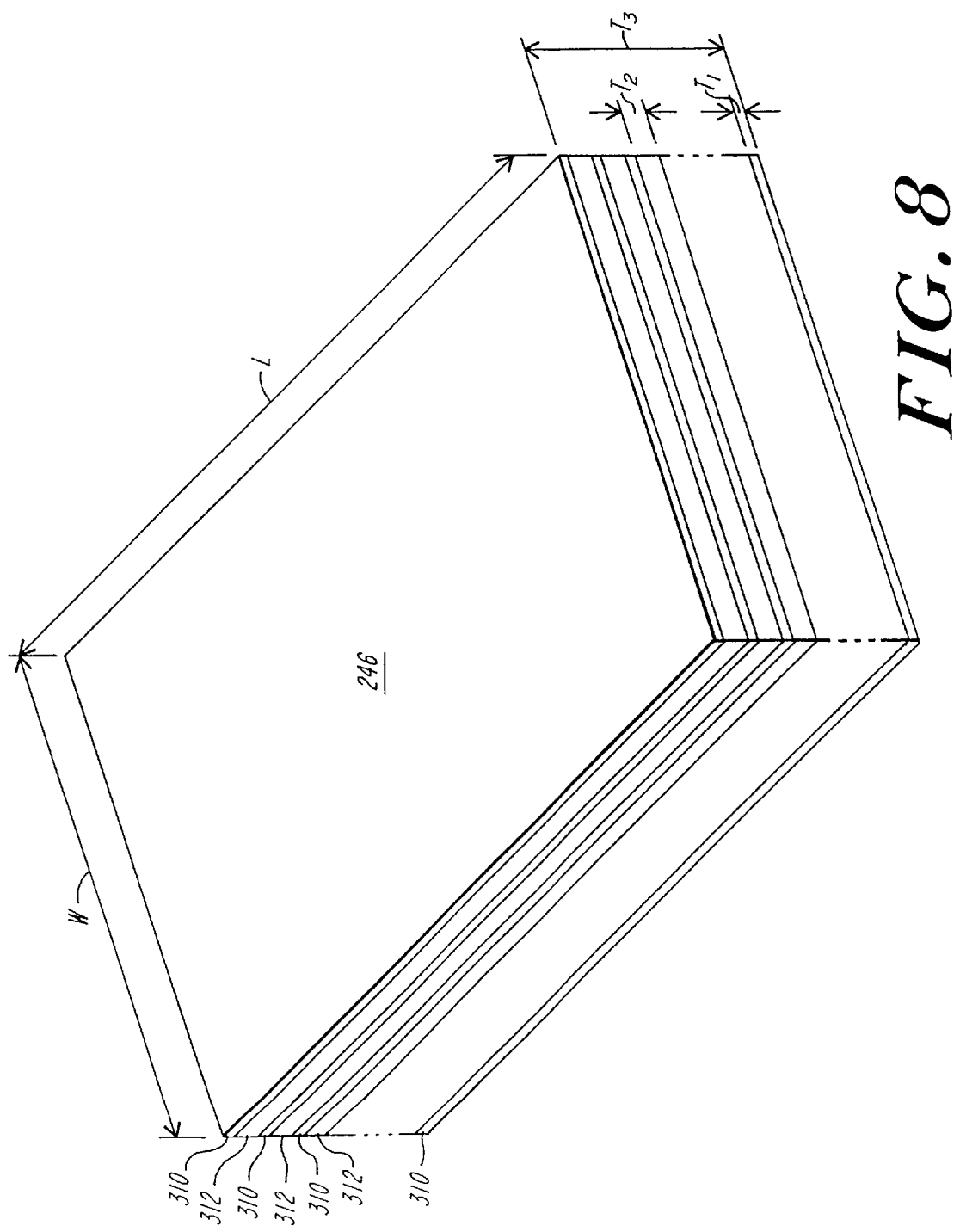

5,808,206

HEATED PRESSURE TRANSDUCER ASSEMBLY

CROSS-REFERENCE TO RELATED APPLICATIONS

This application is a continuation-in-part of U.S. patent application Ser. No. 08/585,535, now U.S. Pat. No. 5,625,152, filed on Jan. 16, 1996 entitled IMPROVED HEATED PRESSURE TRANSDUCER ASSEMBLY, which is assigned to the assignee of the present invention (Attorney Docket No. MKS-032).

FIELD OF THE INVENTION

The present invention relates generally to pressure transducer assemblies. More particularly, the present invention relates to a pressure transducer assembly having improved thermal characteristics.

BACKGROUND OF THE INVENTION

Various vapor deposition processes are known to be useful, for example, in the production of semiconductor products. These processes are typically used to deposit very thin layers of various substances including conductive, semiconductive and insulative materials onto a substrate. Vapor deposition processes typically require each deposited material to be transported to the deposition chamber in a gas state or vapor phase where it is condensed onto the work in process. Efficient operation of such a deposition process requires precise control of the pressure of the gases or vapors used in the process. Where the deposit material in its vapor phase has a relatively low condensation temperature (i.e., well below room temperature) the pressure of the material may be controlled using pressure transducers operating at room temperature. However, where the gas state or vapor phase of a deposit material has a relatively high condensation temperature, i.e., above room temperature, to avoid condensation, such materials are heated and maintained above their condensation temperatures, and thus heated transducers are usually required for measuring the pressures of these hot gases and vapors. Heated pressure transducers are also often heated to prevent sublimation or precipitation of solid material. For example, as is well known, ammonium chloride ($NH_4Cl$) is a chemical by-product of processes for depositing layers of silicon nitride ($Si_3N_4$), and if the pressure and temperature drop too low the $NH_4Cl$ sublimates so that a solid salt forms on any exposed cool surfaces. To prevent such sublimation of $NH_4Cl$, these processes are often conducted at 150° C.

FIG. 1 shows a sectional view of a portion of a prior art heated pressure transducer assembly 100 of the type that is typically used in connection with relatively high temperature, vapor deposition processes. Transducer assembly 100 includes a pressure sensitive sensor 110 that is housed within an interior cavity defined by an external enclosure or housing 112. Sensor 110 is of the capacitive type and includes an input port 110a for receiving the heated vaporized material and two output terminals (not shown) for providing an electrical signal representative of the pressure of the vaporized material entering the transducer assembly. The sensor 110 is configured with a capacitive element so that the measured capacitance created between the two output terminals varies according to a function of the pressure at input port 110a.

Transducer assembly 100 further includes a tube 114 for coupling a source of pressurized vapor to the input port 110a of sensor 110. The tube 114 is coupled at one end 114a to sensor 110 proximal to input port 110a, extends from end 114a through an aperture 112a formed in external enclosure 112, and is coupled at its other end 114b to a heated gas line 122 providing the source of heated pressurized vapor, indicated by numeral 124. Transducer assembly 100 further includes a thermal shell 116, which is typically fabricated from aluminum, a foil heater 118, and a control unit 120 (shown in FIG. 1A). A set of screws 121 (one of which is shown) securely mounts thermal shell 116 within enclosure 112. Foil heater 118 is wrapped around thermal shell 116, and sensor 110 is housed within thermal shell 116 so that tube 114 passes through an aperture 116a in shell 116. Control unit 120 (shown in FIG. 1A) controls the operation of heater 118, measures the capacitance across the output terminals of sensor 110 and generates therefrom a transducer output signal representative of the pressure at input port 110a.

In use, as shown in FIG. 1, end 114b of tube 114 is coupled to a heated gas line 122 containing a pressurized vapor 124 so as to provide a source of the heated, pressurized vapor 124 to input port 110a. Control unit 120 (of FIG. 1A) controls foil heater 118 so that thermal shell 116 and sensor 110 are maintained in substantial thermal equilibrium at a desired operating temperature (i.e., substantially at the same or near the desired temperature of the vapor 124 in line 122). Thermal insulation 146 is normally disposed between thermal shell 116 and the external enclosure so that enclosure 112 normally settles near the ambient temperature, or room temperature, of the area surrounding enclosure 112.

Transducers such as heated transducer assembly 100 have been in use for many years, even though there are several problems associated with the transducer assembly. For example, when transducer assembly 100 is operated at relatively high temperatures, e.g., more than about 80° C., tube 114 becomes a critical source of heat loss. Although during operation, the sensor 110 and the vapor 124 in line 122 are heated to substantially the same operating temperature and the temperatures of both ends 114a, 114b of tube 114 approach this operating temperature, external enclosure 112, which is typically at or near the much cooler ambient temperature, physically contacts tube 114 and tends to thermally conduct a relatively large amount of heat away from tube 114 resulting in a temperature gradient across tube 114. When the heat loss from tube 114 becomes sufficient to cause condensation of the vapor 124 in tube 114, this heat loss adversely affects the accuracy of the pressure measurement provided by transducer assembly 100. Further, even when it is not sufficient to cause condensation, the heat loss from tube 114 may establish a temperature gradient across sensor 110 thereby disturbing the thermal equilibrium of sensor 110 and adversely affecting the accuracy of the pressure measurement provided by transducer assembly 100.

In an effort to control the temperature of tube 114, users of transducer assembly 100 have applied heaters and insulation to the portion of tube 114 extending between enclosure 112 and line 122. Such measures are not always satisfactory. Even when tube 114 is heated sufficiently to prevent condensation of the vapor 124 within tube 114, external enclosure 112 still conducts a relatively large amount heat away from tube 114 and thereby establishes a temperature gradient across tube 114 and sensor 110, and as previously mentioned this temperature gradient can adversely affect the accuracy of the pressure measurement provided by transducer assembly 100.

Users of transducer assembly 100 have also enclosed the entire assembly including external enclosure 112 and tube 114 within a "thermal blanket" in an attempt to prevent condensation of gas 124 within tube 114. However, such measures may cause over heating of the control unit and thereby reduce its lifetime, and may also disturb the thermal equilibrium of sensor 110 and thereby adversely affect the accuracy of the pressure measurement provided by transducer assembly 100.

External enclosure 112 also tends to conduct a relatively large amount of heat away from thermal shell 116 via screws 121, and this heat transfer may establish a temperature gradient across shell 116. In alternative embodiments, this heat loss is controlled by eliminating screws 121 and fixing external enclosure in place by clamping it to tube 114. However, such measures merely increase the heat transfer between tube 114 and enclosure 112 and thereby exacerbate the above-described problems.

Another deficiency of transducer assembly 100 relates to the temperature sensitive nature of control unit 120 (shown in FIG. 1A). As stated above, control unit 120 normally measures the capacitance across the output terminals of sensor 110 and generates therefrom the transducer output signal which is directly representative of the pressure at input port 110a. For example, the transducer output signal is often an electrical signal characterized by a voltage that is proportional to the pressure at input port 110a, and to generate such a signal control unit 120 provides linearization as well as compensation for higher order non-linear effects associated with sensor 110. Control unit 120 also controls the operation of heater 118.

The performance of control unit 120 is generally sensitive to temperature because many of the components used to construct control unit 120 are themselves temperature sensitive. Further, the life times of many of the components used to construct control unit 120 also depend on temperature so that transducer 100 suffers from increased failure rates when control unit 120 is operated at relatively high temperatures. It is therefore desirable to maintain the operating temperature of control unit 120 at a constant so that the performance of control unit 120 does not fluctuate with changes in the ambient temperature, and it is also desirable to operate control unit 120 at a relative low temperature to decrease its failure rate.

Many prior art heated pressure transducers are designed to maintain the temperatures of the sensor 110 and of the control unit 120 at 45° C., and such transducers are often referred to as "45 degree transducers". In 45 degree transducers, the control unit 120 is normally constructed from relatively inexpensive electronic components (i.e., "commercial components") that are rated to operate at the 45° C. temperature. In these units, the control unit 120 is normally mounted within the external enclosure 112 and thereby forms an integral part of the transducer assembly. Due to their relatively low operating temperature, 45 degree transducers enjoy relatively low failure rates, however, their 45° C. operating temperature is too low for many applications.

For many higher temperature applications, "100 degree transducers", which maintain the temperatures of their sensor 110 and their control unit 120 at 100° C., are used. In 100 degree transducers, the control unit 120 is normally constructed from relatively expensive electronic components (i.e., "military components") that are rated to operate at the 100° C. temperature, and the control unit is normally packaged as an integral part of the transducer 100. The use of military components increases the cost of such transducers, and even when these expensive components are used, such transducers suffer from increased failure rates do to the relatively high operating temperature.

For even higher temperature applications, "150 degree transducers", which maintain the temperatures of their sensor 110 at 150° C. are used. Since the 150° C. degree operating temperature is too high even for military components, the control unit 120 in such transducers is normally located remotely from sensor 110 so as to thermally isolate control unit 120 from sensor 110, and the control unit 120 is electrically coupled to sensor 110 and heater 118 by relatively long cables. However, the use of such long cables contributes noise and electrical instability to transducer assembly 100. Further, the packaging of the 150 degree transducers is inconvenient because the control unit 120 is not included as an integral part of the transducer.

Yet another deficiency of the prior art transducer assembly shown at 100 relates to its associated "start up" or "warm up" time. Transducer assembly 100 provides accurate measurements only when sensor 110 is in thermal equilibrium at the desired operating temperature, and the "warm up" time is the time required for transducer assembly 100 to transition from an initial "cold" or "room temperature" state to the desired thermal equilibrium. During warm up of transducer assembly 100, control unit 120 activates heater 118 and thereby applies heat to shell 116 in a controlled fashion so as to maintain the temperature of shell 116 at the desired operating temperature. Transducer assembly 100 includes a thermistor (which as is well known is a device having an electrical resistance that varies according to a function of the device's temperature), indicated at 164 in FIG. 1, disposed on thermal shell 116. Control unit 120 uses thermistor 164 to sense the temperature of thermal shell 116 and controls heater 118 accordingly so as to maintain the temperature of shell 116 at the desired operating temperature. Control unit 120 maintains the temperature of shell 116 equal to the desired operating temperature for as long as is required for sensor 110 to reach thermal equilibrium at the desired operating temperature. When the desired operating temperature is on the order of 150° C., the warm up time of transducer assembly 100 is typically on the order of several (e.g., four) hours, and such a long "warm up" time is often inconvenient.

To facilitate maintaining sensor 110 in thermal equilibrium, transducer assembly 100 normally provides an insulating air gap between thermal shell 116 and sensor 110. Although this air gap facilitates maintaining sensor 110 in thermal equilibrium after sensor 110 has been warmed up to the desired operating temperature, this insulating air gap inconveniently increases the time required to initially warm up sensor 110.

Still another deficiency of prior art pressure transducer assembly 100 relates to the imperfect "thermal equilibrium" provided to sensor 110. As stated above, the capacitance provided across the output terminals of sensor 110 varies according to a function of, and is indicative of, the pressure at input port 110a. However, this capacitance also varies according to a function (normally a nonlinear function) of the temperature, and the rate of change of the temperature, of sensor 110. So sensor 110 only performs accurately when it is at thermal equilibrium at a particular desired operating temperature.

Thermal shell 116, heater 118, control unit 120, and thermal insulation 146 all cooperate and attempt to maintain sensor 110 in thermal equilibrium at the desired operating temperature. Control unit 120 controls heater 118 so as to maintain thermal shell 116 at the desired constant operating temperature of sensor 110. The thermal insulation 146 disposed between external enclosure 112 and thermal shell 116 provides a thermal buffer that minimizes the effect that changing thermal conditions in the ambient environment surrounding enclosure 112 can have on thermal shell 116. However, despite the combined effects of thermal shell 116, heater 118, control unit 120, and thermal insulation 146, the temperature of sensor 110 often deviates from the desired constant operating temperature in response to changing environmental conditions in the ambient environment. Also, the above-described deficiencies of transducer assembly 100, such as the thermal effects associated with tube 114, exacerbate the temperature deviations of sensor 110.

As stated above, in addition to controlling heater 118, control unit 120 also measures the capacitance across the output terminals of sensor 120 and generates therefrom the transducer output signal so that it is representative of the pressure at input port 110a. The portion of control unit 120 that generates the transducer output signal acts as a signal conditioner and provides temperature dependent compensation so as to minimize any changes in the transducer output signal that occur as a result of ambient temperature changes in the area surrounding enclosure 112. This temperature dependent compensation therefore compensates for deviations from the desired constant temperature of sensor 110 that occur as a result of ambient temperature changes. Control unit 110 uses temperature sensitive diodes (not shown) proximal to the control unit to monitor such ambient temperature changes.

When manufacturing large numbers of pressure transducer assemblies, the process of configuring control unit 120 so that it provides compensation for deviations from the desired thermal equilibrium of sensor 110 is time consuming and adds significantly to the cost of manufacturing the transducer assemblies. The transducer assemblies 100 must ordinarily be characterized by operating the assemblies in a thermally controlled oven over a range of thermal conditions. After a particular transducer assembly 100 has been thermally characterized, the control unit 120 for that transducer assembly is then specifically tuned (e.g., by selecting values for electrical components, such as resistors, in the control unit 120) so that it provides appropriate compensation for that assembly 100. If the pressure transducer assembly could provide a more stable thermal environment for sensor 110, a standard control unit 120 could be used in all the transducer assemblies, and the steps of thermally characterizing the assemblies and individually configuring the control units 120 could be eliminated. This would reduce the cost of manufacturing each transducer assembly. However, this has not been considered possible since there is no simple way for the pressure transducer assembly to provide improved thermal stability to sensor 110.

Yet another deficiency of prior art pressure transducer assembly 100 relates to the type of thermal insulation used therein. As stated above, thermal insulation 146 is normally disposed in the gap between external enclosure 112 and thermal shell 116 to shield external enclosure 112 from the heat applied to thermal shell 116 so that the external enclosure 112 may settle at or near the ambient temperature of the area surrounding enclosure 112. In low temperature transducer assemblies (e.g., 45 degree transducers), thermal insulation 146 is often implemented using a polyethylene foam. Such insulators are generally effective since they provide a very low thermal conductivity. However, polyethylene insulators tend to melt or shrink at temperatures exceeding 100° C. So, while polyethylene insulators are suitable for use in relatively low temperature pressure transducer assemblies, they are unsuitable for use in higher temperature pressure transducer assemblies (e.g., 100 degree or 150 degree transducers).

In higher temperature pressure transducer assemblies, thermal insulation 146 is often implemented using a silicone rubber type insulator. Silicone rubber remains physically stable at much higher temperatures than polyethylene, so silicone rubber is preferred over polyethylene for higher temperature pressure transducers. However, the thermal conductivity of silicone rubber is much higher than that of polyethylene insulators. So while silicone rubber has relatively good high temperature characteristics (i.e., it remains physically and structurally stable and does not melt or shrink at high temperatures), it is not an effective insulator.

Various high temperature insulators (i.e., insulators that remain physically stable at high temperatures) having thermal conductivities lower than that of silicone rubber have been designed for use in vacuums and have been used in outer space as well as in certain cryogenic applications. Such insulators are generally layered composites including layers of thermal reflectors separated by web-like spacer layers. These insulators are generally ineffective at blocking thermal convection and are therefore unsuitable for use in non-vacuum (i.e., pressurized) environments. Since pressure transducers are normally used in non-vacuum environments, there is a need for an effective thermal insulator suitable for use in high temperature pressure transducer assemblies.

OBJECTS OF THE INVENTION

It is an object of the present invention to substantially reduce or overcome the above-identified problems of the prior art.

Another object of the present invention is to provide an improved heated pressure transducer assembly having improved thermal characteristics.

And another object of the present invention is to provide an improved heated pressure transducer assembly that provides independent temperature control of the sensor and of the control unit of the transducer.

Yet another object of the present invention is to provide an improved heated pressure transducer assembly that provides ventilation for cooling the transducer assembly without affecting the temperature of the vapor having its pressure measured.

Still another object of the present invention is to provide an improved heated pressure transducer assembly that provides a tube-heater for heating the tube that couples the sensor to a heated gas line.

And another object of the present invention is to provide an improved heated pressure transducer assembly that has a reduced warm up time compared to the FIG. 1 transducer.

Yet another object of the present invention is to provide an improved heated pressure transducer assembly that includes an auxiliary heater for heating the sensor.

Still another object of the present invention is to provide an improved heated pressure transducer assembly that includes two thermistors for sensing the temperatures of the sensor and a thermal shell enclosing the sensor.

And yet another object of the present invention is to provide an improved high temperature thermal insulator suitable for use in non-vacuum environments.

And still another object of the present invention is to provide an improved thermal insulator suitable for use in high temperature pressure transducer assemblies.

And yet another object of the present invention is provide an improved pressure transducer assembly including a tube for coupling a source of pressurized gas or vapor to the sensor, the tube having a thinned section proximal to the sensor.

And still another object of the present invention is to provide an improved pressure transducer assembly that provides improved thermal stability to the sensor.

SUMMARY OF THE INVENTION

These and other objects are provided by an improved heated pressure transducer assembly. In accordance with one aspect of the invention the transducer assembly includes an external enclosure, a first thermal shell housed within the external enclosure, and a sensor housed within the first thermal shell. The transducer assembly further includes a heater for heating the first thermal shell and a control unit for controlling the heater. A tube couples the sensor to a source of heated, pressurized gas or vapor and the transducer assembly may further include a tube-heater that is controlled by the control unit for applying heat to the tube.

In accordance with another aspect of the present invention, the transducer assembly may also include a second thermal shell housed within the external enclosure with at least a portion of the control unit being housed within the second thermal shell. A heater that is controlled by the control unit may be disposed proximal to the second thermal shell for heating that shell.

According to another aspect of the present invention, an auxiliary heater disposed within the first thermal shell for heating the sensor may also be included.

According to yet another aspect of the present invention, two thermistors may also be included for measuring the temperatures of the sensor and the first thermal shell.

According to still another aspect of the present invention, a high temperature insulator, comprising a stack of metalized high temperature films and spacer layers disposed between the films, is disposed between the thermal shell and the external enclosure.

According to yet another aspect of the present invention, the tube coupled to the sensor includes a thinned region proximal to the sensor.

According to still another aspect of the present invention, the thermal shell is fabricated from copper.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE DRAWINGS

For a fuller understanding of the nature and objects of the present invention, reference should be had to the following detailed description taken in connection with the accompanying drawings in which the same reference numerals are used to indicate the same or similar parts wherein:

FIG. 8 shows a perspective view of an improved thermal insulator constructed according to the invention.

DETAILED DESCRIPTION OF THE DRAWINGS

Figure 2A:
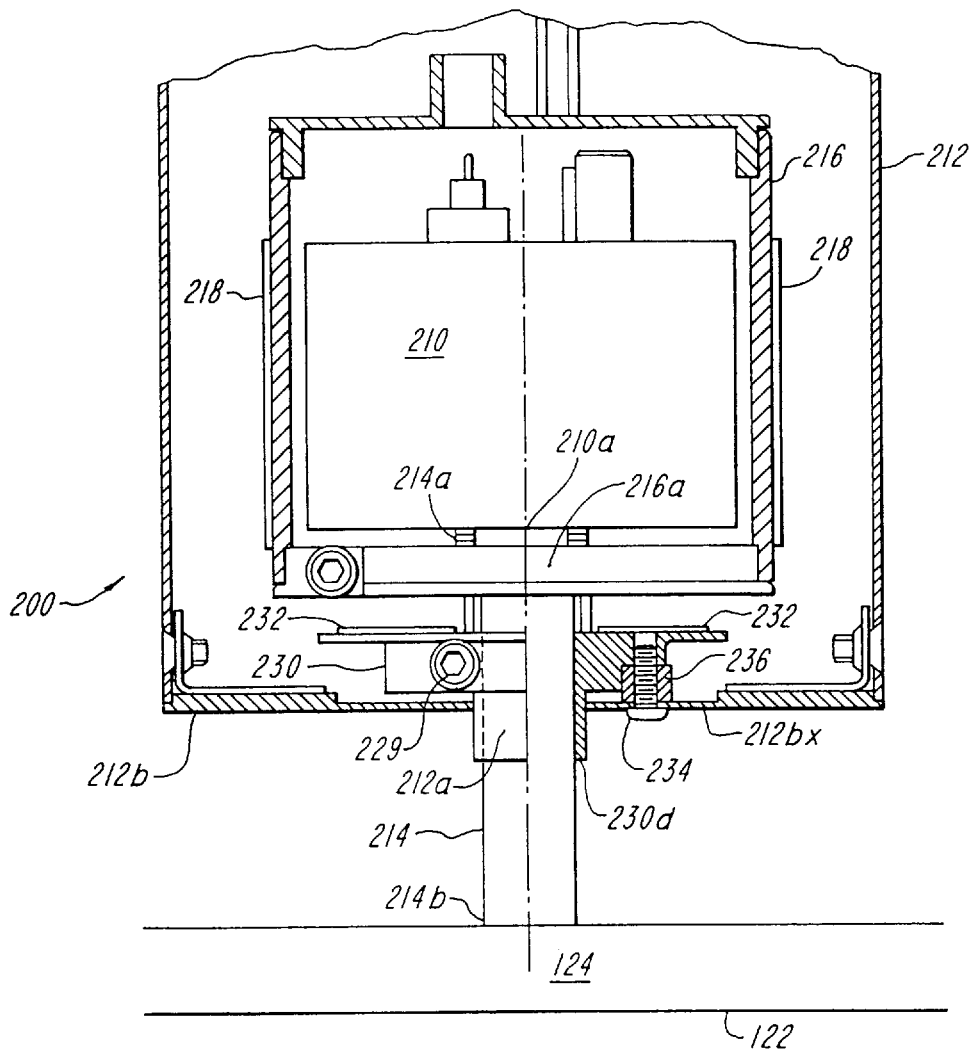
FIG. 2A shows a sectional view of one embodiment of an improved heated pressure transducer assembly constructed according to the invention and including a tube-heater.

FIG. 2A shows a sectional view of a heated pressure transducer assembly 200 constructed according to at least one aspect of the present invention. As will be discussed in greater detail below, transducer assembly 200 provides improved performance over that of prior art transducer assembly 100. Transducer assembly 200 may be advantageously used in connection with high temperature vapor deposition processes, and as those skilled in the art will appreciate, transducer assembly 200 may be used for many other applications as well, such as for example in connection with reactive ion etching processes.

Transducer assembly 200 includes a pressure sensitive sensor 210 that is housed within an interior cavity defined by an external enclosure 212, and includes an input port 210$a$ for receiving a gas or vapor whose pressure is to be measured. Sensor 210 may be, for example, a capacitive type sensor including two output terminals (not shown) configured so that the capacitance, as measured between the two output terminals, is related to and a function of the pressure at input port 210$a$. Sensor 210, however, may be implemented using any form of pressure sensitive transducer having an operating parameter which can be measured that varies according to a function of pressure. Transducer assembly 200 further includes a tube 214 for coupling the input port 210a to a source of pressurized gas or vapor. The tube 214 includes one end 214a coupled to sensor 210 proximal to input port 210a, extends through an aperture 212a defined in a bottom plate 212b of external enclosure 212, and has its opposite end 214b coupled to the gas line 122 carrying the heated vapor 124.

Figure 2B:
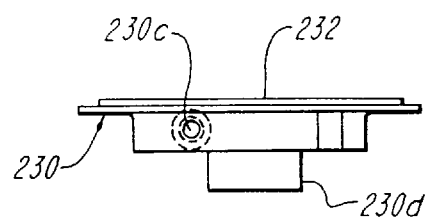
FIGS. 2B and 2C shows end and top views, respectively, of the tube-clamp shown in FIG. 2A.
Figure 2C:
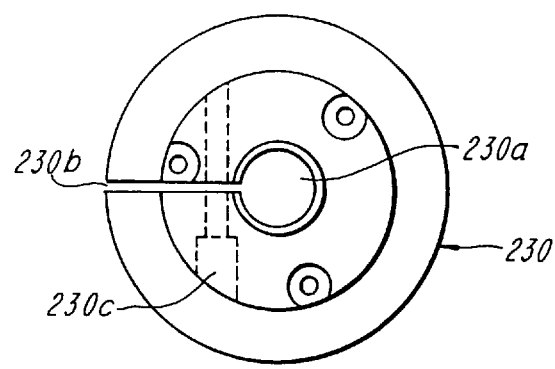
Figure 2D:
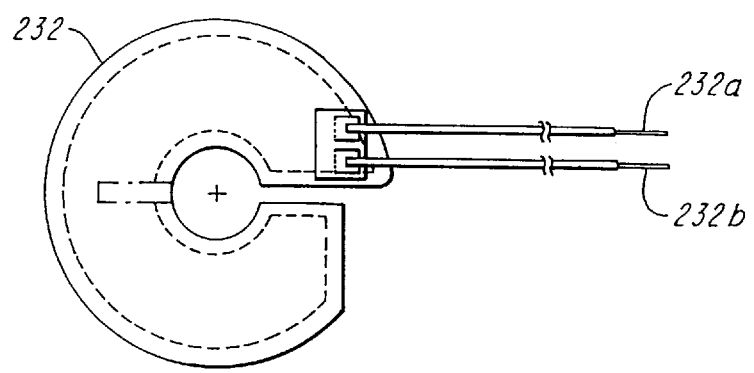
FIG. 2D shows a top view of the tube-heater shown in FIG. 2A.
Figure 2E:
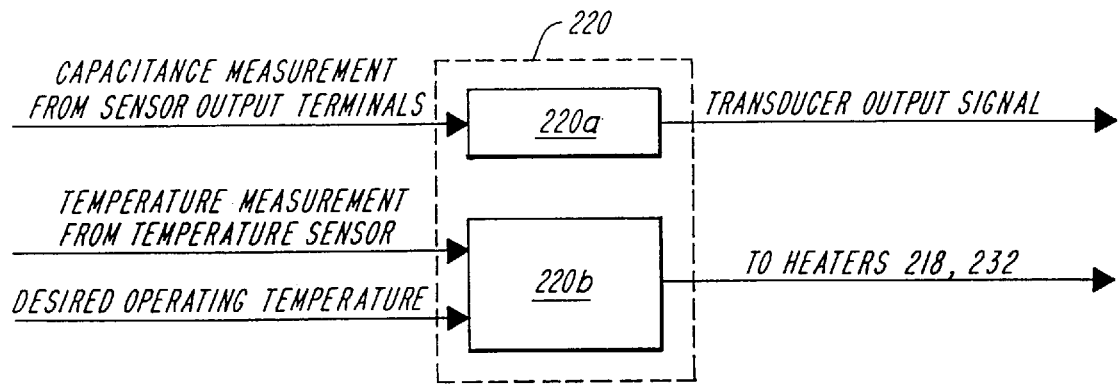
FIG. 2E shows a block diagram of a control unit used in the embodiment described with respect to FIGS. 2A–2D.

Transducer assembly 200 further includes a thermal shell 216 preferably fabricated from material having a relatively high thermal conductivity, a heater 218, and a control unit 220 (the latter being shown in FIG. 2E). Sensor 210 is housed within thermal shell 216 and tube 214 passes through an aperture 216a in shell 216. Thermal shell 216 preferably securely clamps to tube 214 proximal to aperture 216a and thereby remains in a fixed position within external enclosure 212. Heater 218 is disposed proximal to thermal shell 216, and heater 218 is preferably implemented using a foil heater (i.e., a relatively flexible, resistive type, heater) that is wrapped around and secured to an outer portion of thermal shell 216. As seen in FIG. 2E, the preferred control unit 220 includes a signal conditioner 220a for sensing the value of the capacitance between the output terminals of sensor 210 and generating therefrom a transducer output signal representative of the pressure at input port 210a. Control unit 220 also preferably includes a controller 220b for controlling the operation of heater 218, as is described hereinafter in greater detail.

Figure 2F:
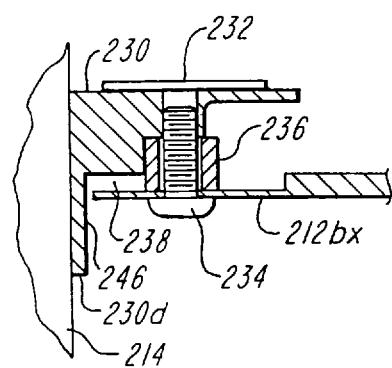
FIG. 2F shows a detail enlarged view of a portion of the transducer assembly of FIG. 2A.

In accordance with one aspect of the present invention, as shown in FIGS. 2A and 2F, transducer assembly 200 additionally includes a tube-clamp 230 that is preferably made from material having a relatively high thermal conductivity and a tube-heater 232. Preferably tube-clamp 230 securely clamps to tube 214, and suitable means, such as a set of screws 234 (one of which is shown in each FIG. 2A and 2F) securely mounts bottom plate 212b of external enclosure 212 to tube-clamp 230. Each of the screws 234 extends through a tubular thermally insulating standoff or spacing collar 236, the standoffs 236 being configured so that when screws 234 are tightened, the standoffs 236 maintain a gap 238 between tube-clamp 230 and bottom plate 212b. Standoffs 236 are made of a thermally insulative material such as plastic or the like so as to thermally insulate tube-clamp 230 from plate 212b, and reduce heat flow between tube-clamp 230 and external enclosure 212.

FIGS. 2B and 2C show end and top views, respectively, of tube-clamp 230. Tube-clamp 230 defines a central aperture 230a, a slot 230b, and a screw-hole 230c. When tube-clamp 230 is mounted to transducer assembly 200 (as shown in FIG. 2A), tube 214 extends through central aperture 230a. The size of aperture 230a may be adjusted by turning a screw (shown at 229 in FIG. 2A) inserted in screw-hole 230c and thereby expanding or contracting slot 230b. When tube-clamp 230 is mounted in transducer assembly 200, the screw in screw-hole 230c is adjusted to sufficiently shrink aperture 230a so that tube-clamp 230 securely clamps, and makes good thermal contact with, tube 214. Tube-heater 232, a preferred embodiment of which is shown in FIG. 2D, is disposed so as to provide good thermal contact with tube-clamp 230 so that the tube-heater efficiently provides heat to tube-clamp 230. Preferably, tube-heater 232 is implemented using a foil heater and is disposed on and secured in good thermal contact with the upper surface of tube-clamp 230 as shown in FIG. 2B. As shown in FIGS. 2D and 2E, in addition to controlling the temperature of heater 218, control unit 220 also controls the temperature of tube-heater 232 by applying current to tube-heater 232 via electrical leads 232a, 232b in response to the temperature sensed by suitable temperature sensing means to be described hereinafter.

In addition to the above, insulation (not shown) is preferably wrapped around the portion of tube 214 extending from bottom plate 212b of the external enclosure 212 to the heated line 122, and no additional heaters are applied to tube 214. In operation, the vapor 124 in line 122 is heated to a desired temperature, and heater 218 heats sensor 210 to the same operating temperature. Tube-heater 232 heats tube-clamp 230 and thereby heats tube 214 to the same, or nearly the same, operating temperature. Since tube-heater 232 effectively heats the portion of tube 214 proximal to plate 212b to the same temperature as the heated vapor 124 in line 122, and since tube 214 is insulated between plate 212b and gas line 122, little or no heat is transferred between the vapor 124 and tube 214. Tube-heater 232 thereby prevents condensation of gas within tube 214 and also substantially reduces or eliminates heat gradients from tube 214 and thereby improves the accuracy of transducer assembly 200.

Tube-clamp 230 and tube-heater 232 provide a thermal buffer between tube 214 and external enclosure 212 and thereby reduce the amount of heat that external enclosure 212 conducts away from tube 214. In other preferred embodiments, transducer assembly 200 includes several features each of which further reduce the amount of heat that external enclosure 212 conducts away from tube 214. Preferably, as shown in FIGS. 2A and 2F, tube-clamp 230 includes a collar 230d, which may or may not be formed as an integral part of the tube-clamp, that extends parallel to tube 214 through aperture 212a of the bottom plate 212b of the external enclosure 212, and thereby prevents plate 212b from directly contacting tube 214 and reduces the amount of heat that external enclosure 212 conducts away from tube 214. Further, as shown in FIG. 2F, aperture 212a of the bottom plate 212b is preferably larger in diameter than the diameter of collar 230d so that there is a gap 246 between plate 212b and collar 230d, and this gap further reduces the amount of heat that external enclosure 212 conducts away from tube 214 (as well as reducing the amount of heat that external enclosure 212 conducts away from tube-clamp 230). Still further, plate 212b preferably includes an internal annular region of reduced thickness 212bx proximal to aperture 212a as shown in FIG. 2F. Due to its reduced thickness, this region 212bx has a higher thermal resistance than the rest of plate 212b and thereby further reduces the amount of heat that external enclosure 212 conducts away from tube-clamp 230.

Figure 1A:
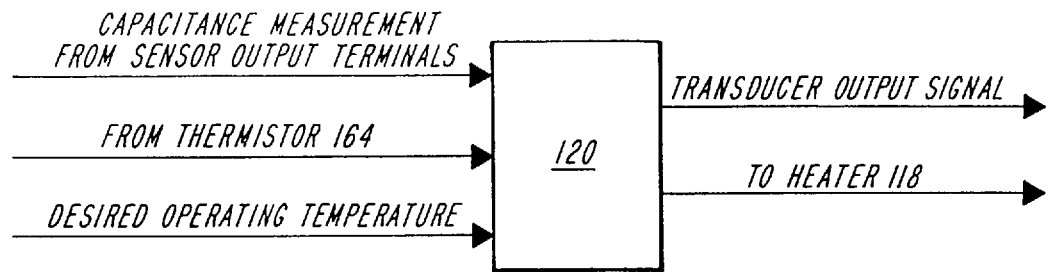
FIG. 1A shows a block diagram of a control unit used in the FIG. 1 embodiment.
Figure 1:
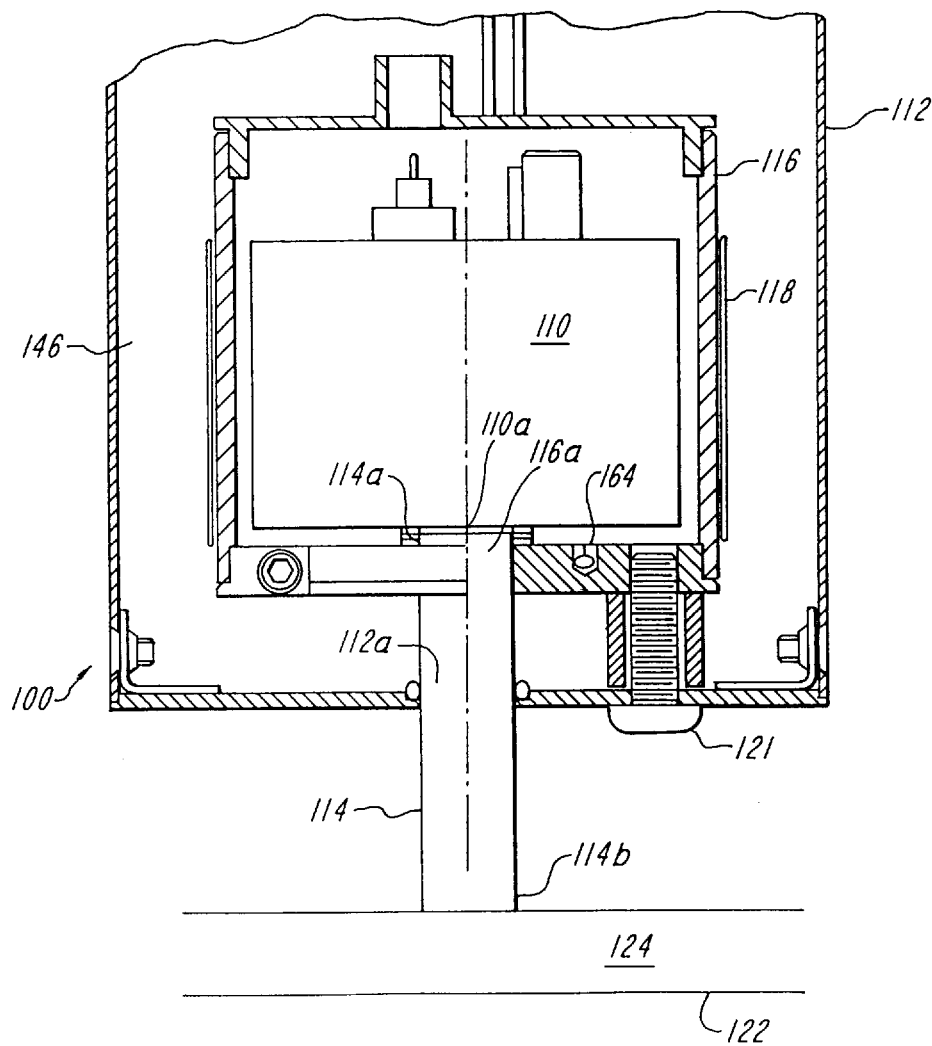
FIG. 1 shows a sectional view of a prior art heated pressure transducer assembly coupled to a heated gas line.

As stated above, purchasers of prior art heated pressure transducer assemblies such as the one shown in FIG. 1 at 100, typically have had to apply heaters to the tube 114 coupling the transducer assembly 100 to a heated gas line 122. Although such heaters have been useful for preventing condensation within the tube 114, use of such heaters adversely affects the accuracy of the transducer assembly because they typically established heat gradients across the sensor 110. In contrast, the additional tube-heater 232 of FIGS. 2A, 2D and 2F is incorporated as a part of and is controlled by transducer assembly 200. Purchasers of transducer assembly 200 therefore need not apply external heaters to tube 214 when transducer assembly 200 is coupled to a source of heated gas or vapor such as line 122. Tube-heater 232 improves the accuracy of transducer assembly 200 by preventing condensation from occurring within tube 214 as well as by dramatically reducing heat gradients across tube 214.

Further, whereas in transducer assembly 100, external enclosure 112 attaches to thermal shell 116, in transducer assembly 200, external enclosure 212 attaches to tube-clamp 230 (e.g., via screws 234). So, the external enclosure tends to conduct heat away from tube-clamp 230 rather than from thermal shell 216 and therefore external enclosure 212 does not contribute to temperature gradients across thermal shell 216 and sensor 210 as was common in the prior art.

In addition to a signal representing the desired operating temperature, at least one temperature sensor (not shown) preferably is used to provide an input signal to the controller 220b of FIG. 2E to indicate the actual temperature at some select location on or in the transducer assembly, or alternatively more than one temperature sensor (not shown) can be used to provide an indication of the temperature at more than one location on or in the transducer assembly (e.g., one temperature sensor may be used to measure the temperature of sensor 210 and another temperature sensor may be used to measure the temperature of tube-clamp 230). Controller 220b may include two separate controllers, such as proportional, internal, and derivative (PID) controllers, one controller for controlling heater 218 and another controller for controlling tube-heater 232. Alternatively, control unit 220 may use a single controller to control the operation of both heaters 218, 232 in response to the input temperature indicating signals. A single controller may control both heaters by, for example, insuring that the ratio of the currents applied to heaters 218 and 232 is a constant.

While preferred embodiments of transducer assembly 200 include tube-clamp 230 and tube-heater 232, improved thermal control over the prior art of tube 214 may be achieved by embodiments of assembly 200 that do not include tube-clamp 230 and tube-heater 232. In such embodiments, aperture 212a is large enough so that bottom plate 212b does not contact tube 214 and insulation (not shown) is preferably wrapped around the entire length of, or portions of, tube 214.

Figure 2G:
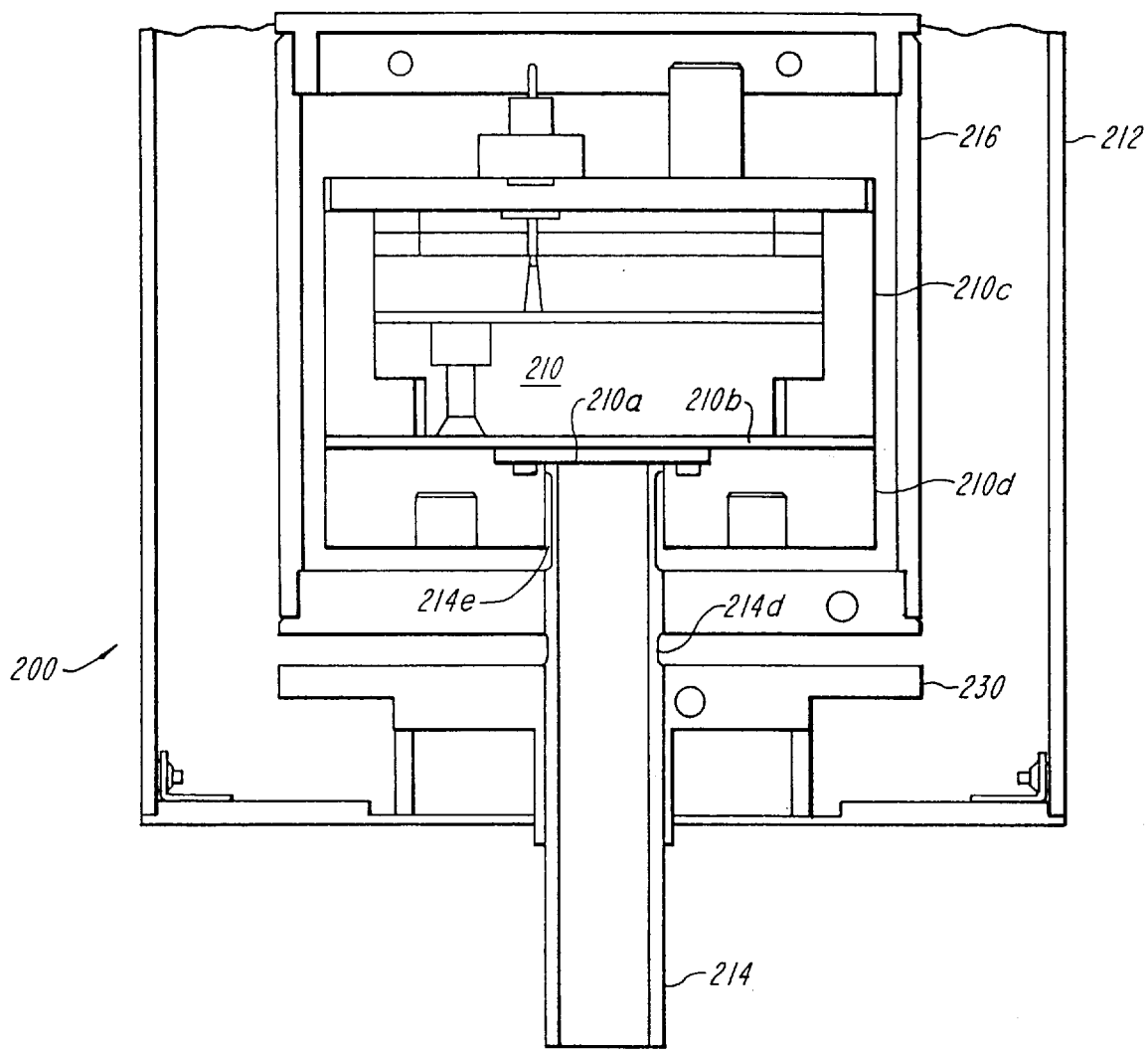
FIG. 2G shows a sectional view of another embodiment of a heated pressure transducer assembly constructed according to the invention in which the tube includes thinned regions.
Figure 2H:
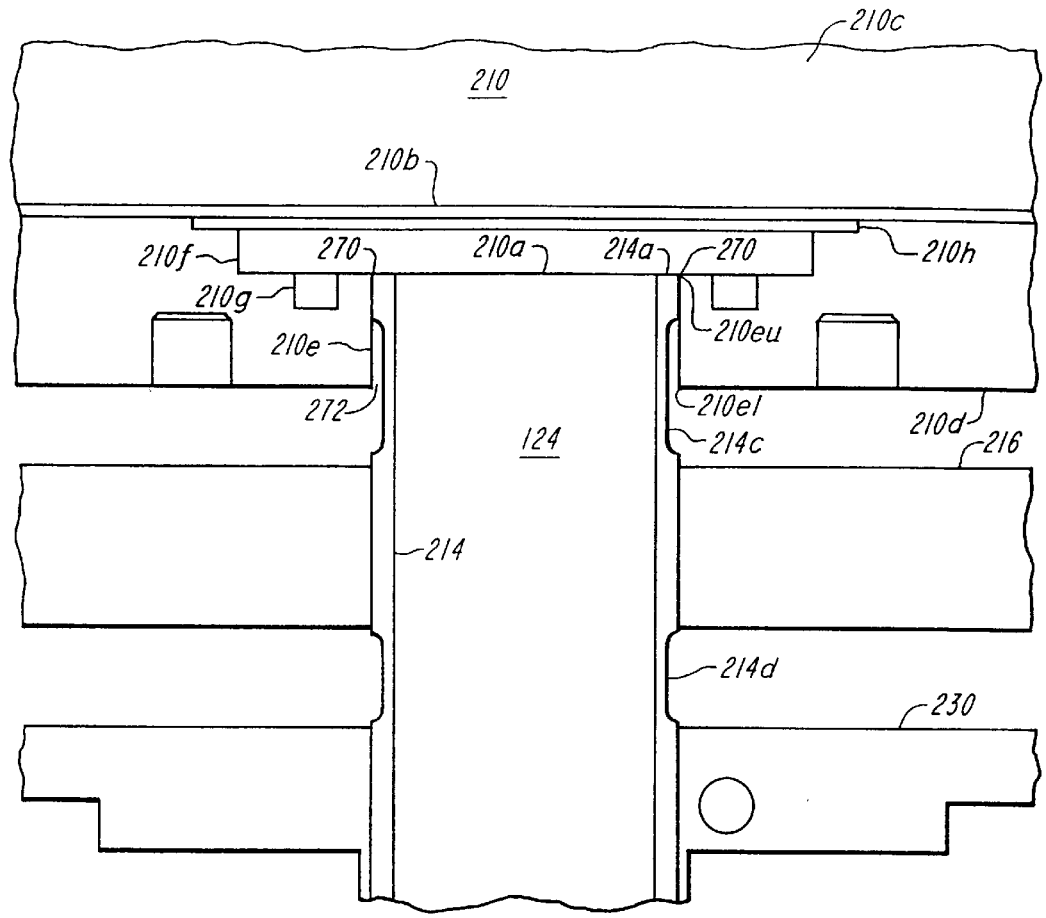
FIG. 2H shows a detail enlarged view of a portion of the transducer assembly shown in FIG. 2G.

FIG. 2G shows a sectional view of another embodiment of pressure transducer assembly 200 in which tube 214 includes two regions 214c, 214d where the walls of the tube are thinned. As shown in FIG. 2G, sensor 210 is normally constructed by welding a relatively thin flexible conductive diaphragm 210b between a tension ring 210c and a flange 210d. Prior to welding these components together, the end 214a of tube 214 is welded to flange 210d. FIG. 2H shows an enlarged view of the thinned regions 214c, 214d as well as the regions where the tube clamp 230, thermal shell 216, and the sensor flange 210d attach to tube 214. Flange 210d defines a bore, or passage, 210e that extends through a portion of flange 210d from a lower end 210el located at one end of flange 210d to an upper end 210eu located in the interior of flange 210d. Flange 210d also defines a second passage 210f that extends from the upper end 210eu of bore 210e through to the end of flange 210d opposite lower end 210el so that bore 210e and the second passage 210f cooperate to form a channel that extends entirely through flange 210d. As shown, the diameter of the second passage 210f is preferably larger than the diameter of bore 210e. During construction of sensor 210, tube 214 is inserted through bore 210e until the end 214a is flush with the upper end 210eu of bore 210e. The end 214a is then welded (e.g., TIG, or Tungsten-Inert-Gas, welded) around the perimeter of the tube to flange 210d at location 270. Flange 210d defines a circular trough 210g, commonly referred to as a "weld prep", that encircles bore 210e. Trough 210g simply insures that the amount of material in flange 210d proximal to weld 270 is comparable to the size of tube 214 so that tube 214 and flange 210d can be welded together as approximately equally sized bodies.

When sensor 210 is fully constructed (i.e., after diaphragm 210b, tension ring 210c, and flange 210d are welded together) the bond or weld between end 214a and flange 210d permits the pressurized gas or vapor 124 in tube 214 to be communicated to the flexible diaphragm 210b and therefore defines the input port 210a. Sensor 210 also normally includes a gas permeable baffle 210h disposed proximal to diaphragm 210b that prevents diaphragm 210b from radiating heat down tube 214. The pressure at input port 210a displaces diaphragm 210b (or causes the diaphragm to flex), and sensor 210 measures the pressure by measuring the amount of displacement of diaphragm 210b. In one preferred embodiment, sensor 210 includes an electrode disposed within the tension ring 210c and spaced apart from the diaphragm so that the diaphragm and the electrode form a variable capacitor. In this embodiment, the capacitance of the variable capacitor is representative of the position of the diaphragm as well as of the gas or vapor pressure in tube 214. The control unit 220 (shown in FIG. 2E) senses the capacitance and generates therefrom the output signal representative of the pressure.

To facilitate the welding of tube 214 and flange 210d, the outer diameter of tube 214 at end 214a is substantially equal to the inner diameter of bore 210e. In prior art assemblies, the outer diameter of tube 214 is substantially uniform along the length of bore 210e so the outer wall of tube 214 substantially contacts the entire inner wall of bore 210e. However, as shown in FIG. 2H, tube 214 includes region 214c where the tube wall is thinned so that the outer diameter of tube 214 is smaller than the inner diameter of bore 210e thus leaving a gap 272 between tube 214 and flange 210d along a portion of the length of bore 210e. Preferably, the thinned region 214c extends along tube 214 to the portion of the tube 214 where thermal shell 216 attaches to tube 214.

Thinning tube 214 in region 214c and forming gap 272 provides several advantages to transducer assembly 200. For example, thinning the tube wall in region 214c increases the thermal resistance of tube 214 and therefore tends to reduce the amount of heat flowing into and out of sensor 210 along tube 214. Increasing this thermal resistance is important because the thermal conductivity of tube 214, which is typically fabricated from a metal such as inconel, is much higher than that of the air surrounding sensor 210, so a large percentage (e.g., 30%) of the heat transferred between thermal shell 216 and sensor 210 tends to flow along tube 214. Since tube 214 contacts only a relatively small portion of sensor 210, any heat flowing into or out of sensor 210 along tube 214 tends to establish a thermal gradient across sensor 210 and thereby disturbs the accuracy of pressure transducer assembly 200. So, including thinned region 214c in tube 214 tends to decrease the heat flowing into or out of sensor 210 along tube 214 and enables a more uniform exchange of heat between the thermal shell 216 and sensor 210. This increases the thermal stability of, and reduces thermal gradients across, sensor 210.

Thinning the wall of tube 214 at region 214c also has the advantage of creating the gap 272 between tube 214 and flange 210d. Providing gap 272 is advantageous since the clamping action of thermal shell 216 and tube clamp 230 onto tube 214 tends to warp, or distort the shape of, tube 214. For example, in embodiments where tube 214 is cylindrical, the clamping action of thermal shell 216 tends to distort tube 214 so that its cross section is somewhat elliptical rather than circular. When gap 272 is not provided, such distortions disturb the fit between tube 214 and bore 210e so that tube 214 applies stress to, or wedges against, sensor flange 210d.

Since flange 210d is welded to diaphragm 210b, this stress tends to disturb the performance of sensor 210 and thereby adversely affects the performance of the pressure transducer assembly. So, providing gap 272 allows bore 210e to accommodate such distortions in tube 214 without stressing flange 210d and thereby improves the accuracy of transducer assembly 200.

Thinning the wall of tube 214 at region 214c also has the advantage of increasing the mechanical compliance of tube 214. So, while the clamping action of thermal shell 216 onto tube 214 may distort the shape of the tube in region 214c, these distortions do not tend to significantly affect the shape of the tube 214 at end 214a. Region 214c therefore provides a buffer zone for absorbing mechanical stress introduced between end 214a and the portion of tube 214 to which thermal shell 216 is clamped.

Tube 214 also includes thinned region 214d disposed between the thermal shell 216 and the tube clamp 230. This thinned region reduces the amount of heat flowing into and out of thermal shell 216 along tube 214. Region 214d thereby reduces thermal gradients across thermal shell 216 and this in turn reduces thermal gradients across sensor 210.

The wall of tube 214 in region 214c is preferably sufficiently thick so that tube 214 can adequately and securely support the weight of sensor 210, and so that the wall will remain substantially rigid and will not distort in response to the vapor pressures present in tube 214. Similarly, the wall of tube 214 in region 214d is preferably sufficiently thick so that tube 214 can adequately and securely support the weight of sensor 210 and thermal shell 216. In one preferred embodiment, tube 214 is constructed from inconel and the walls of tube 214 in regions 214c and 214d are 0.015 inches thick, the walls in the remaining portions of tube 214 are 0.03 inches thick, and the inner diameter of tube 214 is substantially equal to 0.44 inches.

Thus far, tube 214 has been described in terms of having a cylindrical geometry, with the bore 210e also being cylindrical, and the outer diameter of tube 214 in region 214c being smaller than the inner diameter of bore 210e. However, those skilled in the art will appreciate that the invention is not limited to cylindrical geometries. For example, tube 214 may have a square or rectangular cross section, and bore 210e may have a complimentary cross section. In this case, the outer perimeter of tube 214 at end 214a is substantially equal to the inner perimeter of bore 210e, and the outer perimeter of tube 214 in region 214c is smaller than the inner perimeter of bore 210e so that gap 272 is created. Further, in other embodiments bore 210e need not have a constant cross section and could be for example conically shaped. In such an embodiment, a complimentary geometry is preferably selected so that the outer perimeter of end 214a is substantially equal to the inner perimeter of bore 210e at weld 270, and so that gap 272 is provided along at least a portion of bore 210e between weld 270 and tube clamp 230.

As stated above, in prior art pressure transducer assembly 100 (shown in FIG. 1) thermal shell 116 is normally fabricated from aluminum. In accordance with another aspect of the present invention, in improved pressure transducer assembly 200, thermal shell 216 is fabricated from copper, or from an alloy including copper. In preferred embodiments, thermal shell 216 is fabricated from an alloy including at least 99% copper. Copper thermal shell 216 is preferably fabricated so that its dimensions are substantially similar to the dimensions of prior art aluminum thermal shell 116. For example, in one embodiment copper thermal shell 216 is cylindrical and has sidewalls that are approximately 0.125 inches thick, a diameter of approximately two and one half inches, and a height of approximately two inches. As is well known, copper is nearly three and one half times denser than aluminum so copper thermal shell 216 is much heavier than aluminum thermal shell 116. Although aluminum has a higher heat capacity per unit weight than copper, copper has a higher heat capacity per unit volume than aluminum. Since the volumes of copper thermal shell 216 and aluminum thermal shell 116 are selected to be substantially similar, the thermal mass of copper thermal shell 216 is higher than that of aluminum thermal shell 116. Also, since the thermal conductivity of copper is higher than that of aluminum, the thermal conductivity of copper thermal shell 216 is higher than that of aluminum thermal shell 116. Copper thermal shell 216 also provides a higher thermal diffusivity (where as is well known, thermal diffusivity is the ratio of thermal conductivity to the product of the specific heat and density) than does aluminum thermal shell 116.

The higher thermal conductivity, thermal mass, and thermal diffusivity provided by copper thermal shell 216 greatly improves the thermal stability of sensor 210. The higher thermal mass provided by copper thermal shell 216 tends to decrease the effect that temperature fluctuations in the environment surrounding transducer assembly 200 have on the thermal environment of sensor 210 (i.e., the temperature in the region inside thermal shell 216). The higher thermal conductivity provided by copper thermal shell 216 tends to decrease temperature gradients across the thermal shell and therefore also tends to decrease temperature gradients across the sensor 210. Its higher thermal diffusivity allows copper thermal shell 216 to dissipate any heat introduced to the shell more quickly than does aluminum thermal shell 116. All these advantages of copper thermal shell 216 combine to significantly improve the thermal stability of sensor 210.

Copper materials suitable for constructing thermal shell 216, such as copper pipes, are readily available. However, copper is a more expensive material than aluminum, and in general aluminum is easier to machine and process than copper. For these reasons, copper thermal shell 216 is more expensive to produce than is aluminum thermal shell 116. So an initial cost analysis would suggest that use of copper thermal shell 216 would disadvantageously increase the total cost of transducer assembly 200.

As stated above, in prior art transducer assemblies such as assembly 100 (shown in FIG. 1), thermal insulation 146 is normally disposed between the external enclosure 146 and the thermal shell 116. This insulation provides a thermal buffer that insulates thermal shell 116 from temperature changes occurring in the ambient environment surrounding external enclosure 112. In the prior art it has generally been believed that when insulation 146 is included in the transducer assembly 100, the thermal characteristics of aluminum were sufficient for use in thermal shell 116, and use of more expensive higher performing materials such as copper was not justified.

A transducer assembly 200 has been constructed using copper thermal shell 216. The thermal stability of the sensor 210 in that assembly is so improved that deviations in the capacitance provided by sensor 210 occurring in response to changing environmental conditions in the area surrounding the assembly are negligible and may be ignored. Therefore, when transducer assembly 200 is constructed using copper thermal shell 216, control unit 220 need not provide temperature dependent compensation when generating the transducer output signal as is required of the prior art control unit 120 used in prior art transducer assembly 100. Although copper thermal shell 216 is more expensive than aluminum thermal shell 116, use of copper thermal shell 216 eliminates the need for control unit 220 to provide temperature dependent compensation when generating the transducer output signal. So use of copper thermal shell 216 obviates the need for thermally characterizing each transducer assembly and tuning or matching a control unit to each transducer assembly. This reduces the cost of producing transducer assembly 200. The reduction in cost associated with eliminating temperature dependent compensation from control unit 220 outweighs the cost increase associated with the higher cost of copper thermal shell 216. So, use of copper thermal shell 216 unexpectedly and advantageously reduces the cost of producing transducer assembly 200. Copper thermal shell 216 may be advantageously used in relatively low temperature transducer assemblies (e.g., 45 degree units) as well as in relatively high temperature transducer assemblies (e.g., 200 degree units).

As stated above, in certain prior art heated pressure transducers, the control unit is formed as an integral part of the transducer assembly. However, these transducer assemblies use relatively low operating temperatures (e.g., 45° C.), use expensive military rated components, or suffer from relatively short lifetimes. Accordingly in many other prior art heated pressure transducer assemblies the control unit is located remotely from the transducer assembly to prevent the heat that is applied to the sensor from adversely affecting the performance of the temperature sensitive control unit. Typically, the control unit is connected to the transducer assembly with cables. However, locating the control unit remotely from the transducer assembly provides an inconvenient packaging for the transducer assembly as well as increasing the electrical instability of the transducer assembly and increasing the noise in the output of the transducer.

In contrast to the prior art, in accordance with yet another aspect of the present invention, control unit 220 is formed as integral part of the transducer assembly 200, wherein the temperature of control unit 220 is controlled independently from the temperature of sensor 210. Eliminating the long cables normally used to couple the control unit to the sensor improves the stability and noise immunity of transducer assembly 200, and independently controlling the temperature of control unit 220 provides for a longer life time of transducer assembly 200 and allows transducer assembly 200 to perform consistently and repeatedly over a wide range of operating temperatures of sensor 210. Further, including control unit 220 as an integral part of transducer assembly 200 provides a convenient packaging for a heated transducer. Preferably the temperature of control unit 220 is controlled to be a constant that is less than or equal to 60° C. since this permits control unit 220 to be fabricated from relatively inexpensive electronic components that are not rated to operate above this temperature. Higher operating temperatures of control unit 220 are of course possible and in this case control unit is preferably fabricated from more expensive electrical components (e.g., military rated components) that have a higher operating temperature range. In any case, the temperature of control unit 220 is controlled to be lower than that of sensor 210.

Figure 3:
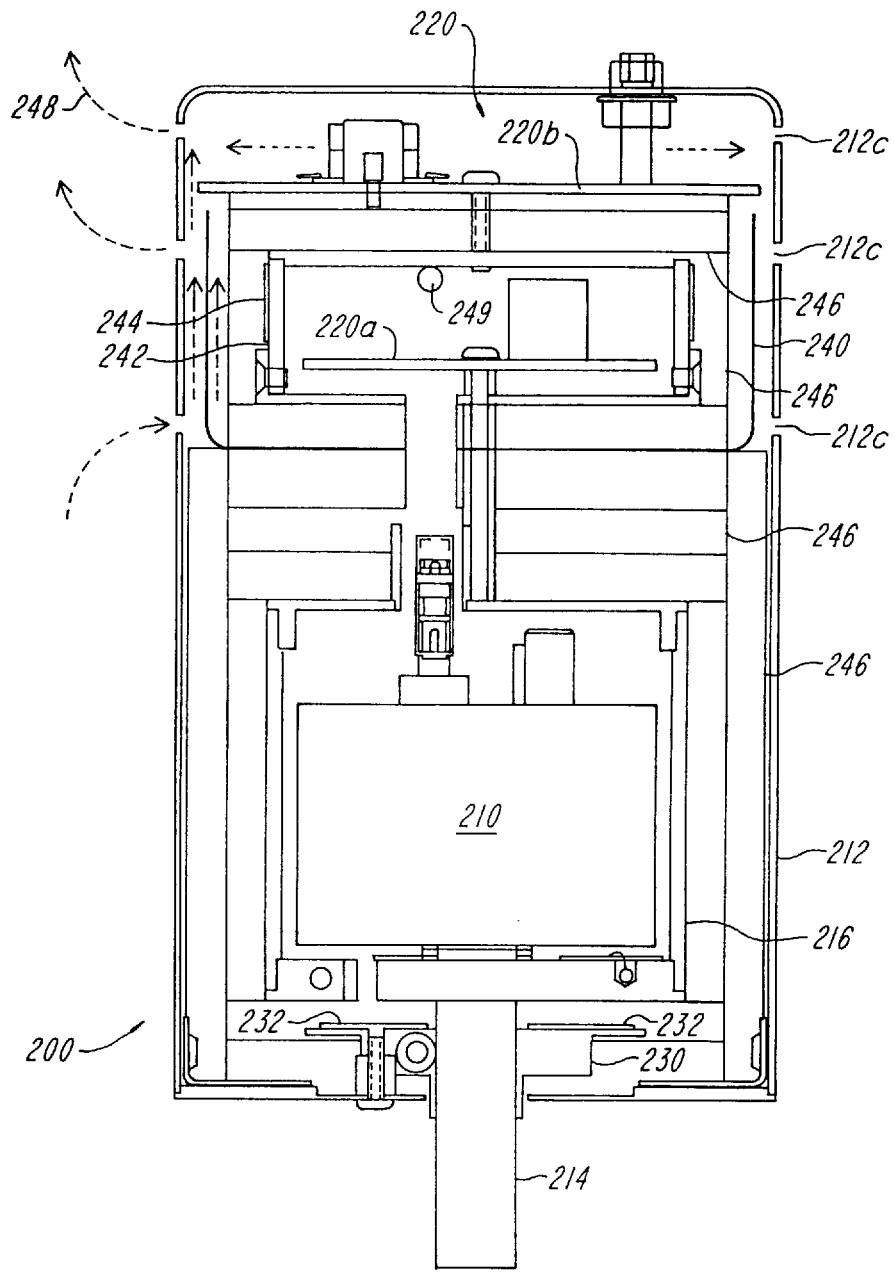
FIG. 3 shows a sectional view of one embodiment of a heated pressure transducer assembly constructed according to the invention that provides venting for cooling the control unit.

FIG. 3 shows one embodiment of transducer assembly 200 in which control unit 220 is formed integrally as a part of transducer assembly 200. In this embodiment, transducer assembly 200 additionally includes a thermal-shunt 240 that is preferably fabricated from material having a relatively high thermal conductivity and is disposed so as to divide the internal cavity defined by external enclosure 212 into a lower portion and an upper portion. Sensor 210 is housed below shunt 240 in the lower portion of the internal cavity and control unit 220 is housed above shunt 240 in the upper portion of the internal cavity. In the illustrated embodiment, control unit 220 is implemented using two printed circuit (PC) boards 220a, 220b. Transducer assembly 200 also includes a thermal shell 242 of a relatively high thermally conductive material for housing PC board 220a, and a heater 244, disposed in thermal contact with shell 242, that is operated under the control of control unit 220. PC board 220b is housed above thermal shell 242. External enclosure 212 further defines a plurality of slots, or vents, or apertures, 212c, which as will be discussed in greater detail below are useful in providing cooling. Insulation 246 is preferably disposed between thermal shell 242 and thermal shunt 240, and also between thermal shell 216 and external enclosure 212. Transducer assembly 200 also preferably includes a thermistor 249 disposed to be in thermal contact with thermal shell 242 for measuring the temperature of shell 242.

Control unit 220 self-regulates its own temperature thereby obviating the need for locating the control unit remotely. Therefore, all of the components of transducer assembly 200 are conveniently packaged within external enclosure 212 and transducer assembly 200 provides improved stability and noise immunity.

In operation, thermal shunt 240 and vents 212c cooperate to provide convective cooling and thereby maintain a desired temperature differential between sensor 210 and control unit 220. Arrows 248 illustrate the direction of air flow through transducer assembly 200. Insulation 246 prevents some heat from being transferred from sensor 210 to control unit 220, and thermal shunt 240 conducts excess heat away from sensor 210 towards the perimeter of transducer 200 where cooling air currents flowing through vents 212c conduct the heat away from transducer 200. While in other embodiments of transducer 200, active refrigeration units (not shown) could of course be employed to maintain a desired temperature differential between control unit 220 and sensor 210, in the preferred embodiments no such refrigeration units are used. In the embodiment illustrated in FIG. 3, when heater 244 remains inactive, thermal shunt 240 and vents 212c provide sufficient cooling to maintain the temperature of thermal shell 242 and control unit 220 below the desired operating temperature of unit 220. So in operation, control unit 220 may maintain thermal shell 242 and control unit 220 in thermal equilibrium at the desired operating temperature simply by using heater 244 to apply heat to thermal shell 242 (i.e., no active refrigeration is required). Control unit 220 preferably includes a controller, such as a PID controller for controlling heater 244 in response to a temperature measurement of shell 242 provided by thermistor 249.

In the illustrated embodiment of FIG. 3, control unit 220 is implemented using two PC boards 220a, and 220b, and only board 220a is located within thermal shell 220, while the other board 220b is located above the shell. In general, with this arrangement the most temperature sensitive components of control unit 220 are located on board 220a, and the components of control unit 220 that produce the most heat are located on board 220b. Controller 220 controls heater 244 so as to maintain thermal shell 242 and board 220a in thermal equilibrium whereas the temperature of board 220b is allowed to fluctuate slightly away from the equilibrium temperature as a function of the convective air currents and the amount of heat generated by PC board 220b. Including only PC board 220a within shell 242 simplifies the thermal control of unit 220, however, in other embodiments all of control unit 220 could of course be located within thermal shell 242.

Preferably, control unit 220 maintains its own temperature so that it is substantially constant, e.g. at 60° C., regardless of the operating temperature of sensor 210. The embodiment illustrated in FIG. 3 provides sufficient cooling for maintaining at least a 90° C. difference between sensor 210 and controller 220. Sensor 210 may therefore be operated at least as hot as 150° C. without interfering with the desired 60° C. operating temperature of control unit 220. When sensor 210 is maintained at an operating temperature of 150° C. transducer assembly 200 is ideally suited for use with silicon nitride chemical vapor deposition processes.

Figure 4:
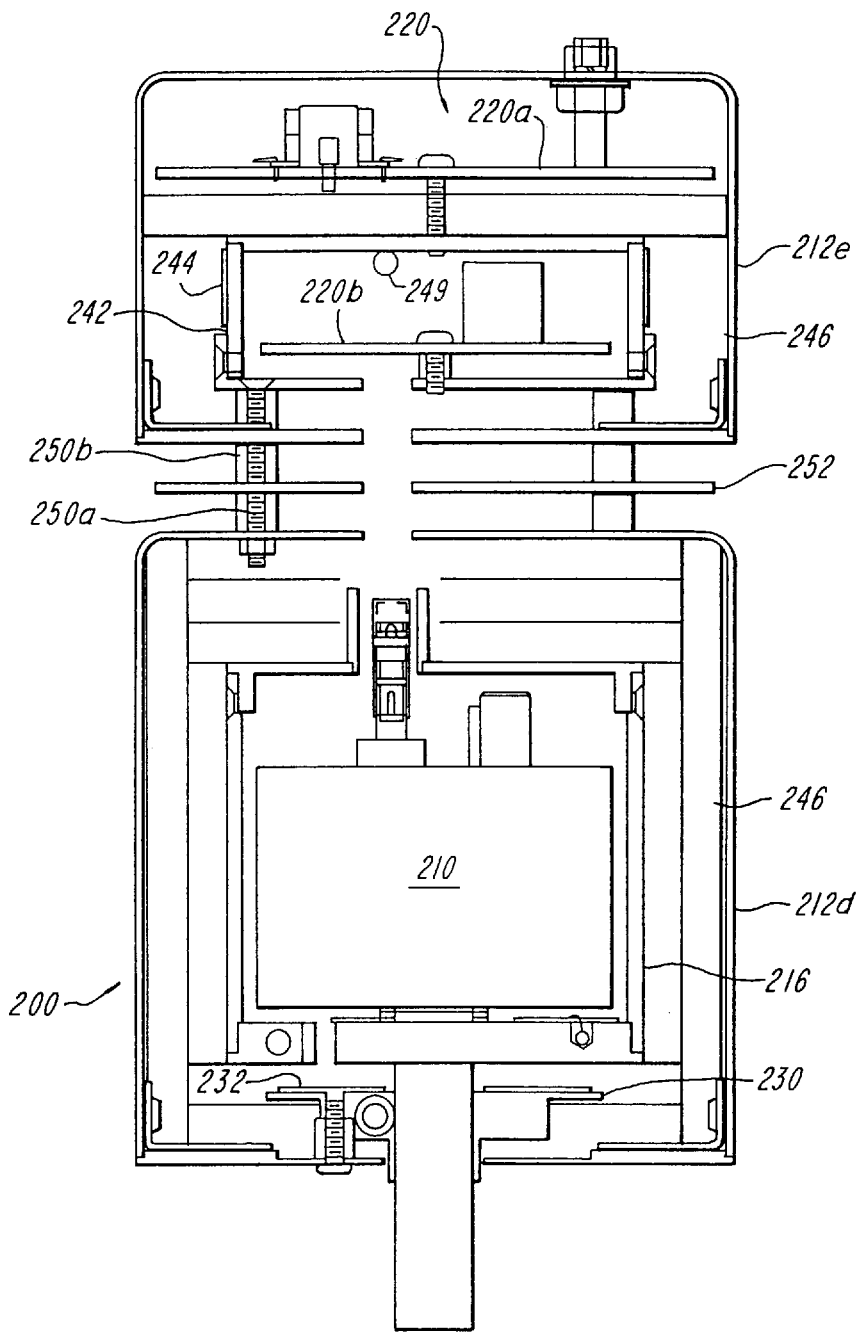
FIG. 4 shows a sectional view of yet another embodiment of a heated pressure transducer assembly constructed according to the invention that provides venting for cooling the control unit.

FIG. 4 shows a sectional view of still another aspect of the present invention, wherein the transducer assembly 200 shown provides additional cooling when compared to the embodiment illustrated in FIG. 3. In the embodiment illustrated in FIG. 4, external enclosure 212 includes a lower enclosure, or lower compartment, 212d and an upper enclosure, or upper compartment, 212e that are fixed relative to one another by suitable means such as a set of screws 250a (one of which is shown). Each of the screws extends through a respective one of a set of tubular thermally insulating standoffs or thermally insulative spacing collars 250b, which are preferably fabricated from thermally insulating material such as plastic, so that when screws 250a are tightened the standoffs 250b maintain a selected spacing between enclosures 212d, 212e. This embodiment of transducer assembly 200 further includes a thermal shunt, or radiating fin, 252 (formed as an annular disk) that is fabricated from material having a relatively high thermal conductivity, is disposed between lower and upper enclosures 212d, 212e, and is in thermal contact with standoffs 250b. Thermal shunt 252 helps shield upper enclosure 212e from the heat generated in lower enclosure 212d, and also provides dissipation for any heat flowing along standoff 250b. The openings in the space between lower and upper enclosures 212d, 212e provides increased venting.

In operation, controller 220 of FIG. 4 preferably maintains its own temperature at 60° C. The venting provided by this embodiment provides sufficient cooling to maintain controller 220 in thermal equilibrium at least 140° C. below the temperature of sensor 210. Sensor 210 may therefore be operated at least as hot has 200° C. without interfering with the desired 60° C. operating temperature of control unit 220.

Figure 5A:
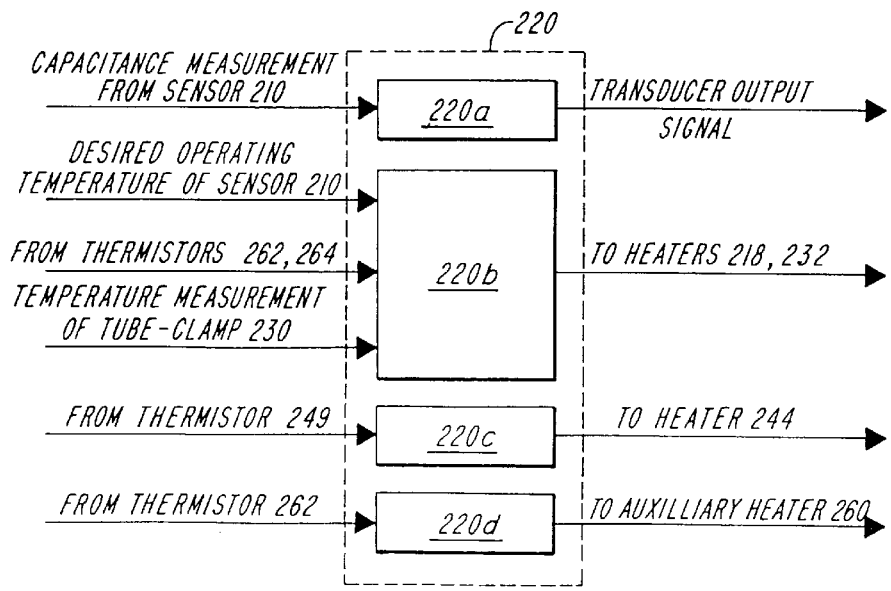
FIG. 5A shows a block diagram of a control unit used in the embodiment described with respect to FIG. 5.
Figure 5:
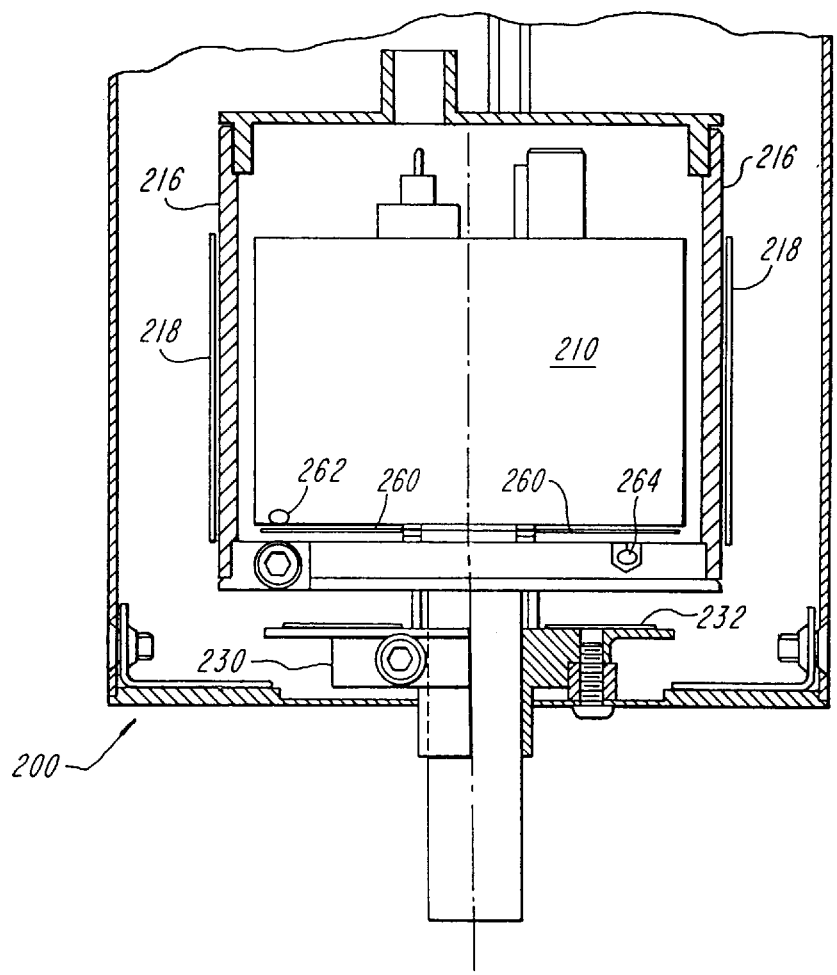
FIG. 5 shows a sectional view of an embodiment of a heated pressure transducer assembly constructed according to the invention and including an auxiliary heater and two thermistors.

In yet another aspect of the present invention, transducer assembly 200 includes means for providing a reduced warm up time. FIG. 5 illustrates a portion of a preferred embodiment of the means for providing a reduced warm up time which includes an auxiliary heater 260 as well as two thermistors 262, 264. Auxiliary heater 260 is preferably disposed within thermal shell 216 proximate to sensor 210 for applying heat to sensor 210 under the control of control unit 220. Thermistor 262 is also disposed within thermal shell 216, in thermal contact with sensor 210, for providing control unit 220 with a measurement of the temperature of sensor 210. Thermistor 264 is disposed in thermal contact with thermal shell 216 for providing control unit 220 with a measurement of the temperature of shell 216. Since the temperatures of thermistors 262 and 264 are typically much higher than that of control unit 220, thermistors 262 and 264 are preferably fixed to sensor 210 and thermal shell 216, respectively, with suitable means such as thermal anchors.

Figure 6:
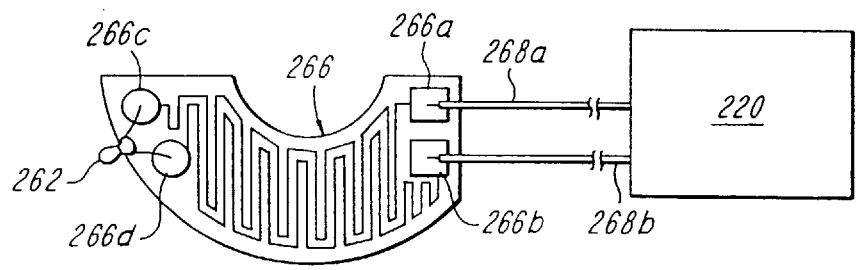
FIG. 6 shows a thermal anchor of the type used for thermally anchoring the thermistors shown in FIG. 5.

Referring to FIG. 6, the latter shows thermistor 262 electrically coupled to control unit 220 via a thermal anchor 266. Specifically, control unit 220 is electrically coupled to two leads 268a and 268b, which are in turn electrically coupled to two pads 266a and 266b, respectively, of thermal anchor 266. Pad 266a is electrically connected to another pad 266c, and pad 266b is electrically connected to another pad 266d, and finally the terminals of thermistor 262 are electrically coupled to pads 266c and 266d. Thermal anchor 266, which is a relatively good heat conductor, is fixed to sensor 210 (not shown) and thermistor 262 also preferably contacts sensor 210.

Leads 268a and 268b are good electrical conductors and consequently are also relatively good thermal conductors. If thermal anchor 266 were not used and the relatively cool (e.g., 50° C.) control unit 220 coupled directly to the relatively hot (e.g., 150° C.) thermistor 262 via leads 268a, 268b, then heat would tend to flow from thermistor 262 via leads 268a, 268b, to control unit 220. Since thermistor 262 is a relatively small device, this amount of heat flow would lower the temperature of thermistor 262 and thereby disturb the temperature measurement of sensor 210. Fixing the relatively large thermal anchor 266 to sensor 210 tends to stabilize the temperature of thermistor 262 and insures that most of the heat flowing along leads 266a, 266b comes from sensor 210 rather than from thermistor 262. Thermistor 264 is of course also preferably coupled to thermal shell 216 with a thermal anchor similar to that of anchor 266 and similarly, all other thermistors in transducer assembly 200 (such as thermistor 249) are preferably coupled to the devices that they provide a temperature measurement of with thermal anchors.

As stated above, prior art transducer assembly 100 (shown in FIG. 1) is warmed up by heating thermal shell 116 to the desired operating temperature $T_d$ and then waiting as long as is required for sensor 110 to converge to this temperature. Control unit 120 uses thermistor 164 to sense the temperature of thermal shell 116 and controls heater 118 accordingly so as to maintain the temperature of shell 116 equal to the desired operating temperature $T_d$. In contrast to the prior art, in transducer assembly 200 (shown in FIG. 5), controller 220b of control unit 220 uses thermistors 262 and 264 to measure an average temperature $T_{Ave}$, where $T_{Ave}$ is equal to an average of the temperatures of the sensor 210 and thermal shell 216, and control unit 220 controls heater 218 so as to maintain this average temperature $T_{Ave}$ equal to the desired operating temperature $T_d$. So, whereas in prior art transducer assembly 100 the temperature of thermal shell 116 never exceeds the desired operating temperature $T_d$, in transducer assembly 200 the temperature of thermal shell 216 may exceed $T_d$ as long as the temperature of sensor 210 is below $T_d$.

Figure 7A:
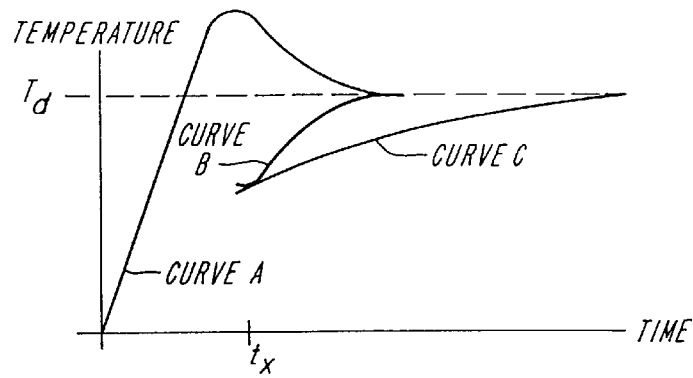
FIGS. 7A–7C show graphs of temperature versus time illustrating the improvement in warm up time provided by heated pressure transducers constructed according to the invention.

FIG. 7A shows three curves, curves A, B, and C which illustrate the benefits provided by thermistors 262, 264. Curves A and B illustrate the temperatures of thermal shell 216 and sensor 210, respectively, as functions of time. During warm up of transducer assembly 200, controller 220b controls heater 218 so as to increase the temperature of thermal shell 216, preferably at the maximum available rate, until the average temperature $T_{Ave}$ is equal to the desired operating temperature $T_d$. As shown in curves A and B, controller 220b uses heater 218 to increase the temperature of shell 216 until a time $t_x$ when the average temperature $T_{Ave}$ (obtained by adding the values on curves A and B at this moment in time and dividing by two) is equal to the desired operating temperature $T_d$. For all time following $t_x$, control unit 210 maintains the average temperature $T_{Ave}$ equal to $T_d$, so as the temperature of sensor 210 increases towards $T_d$, the temperature of shell 216 is correspondingly decreased so as to maintain the average temperature $T_{Ave}$ at a constant.

Curve C illustrates the temperature of prior art sensor 110 as a function of time during warm up of transducer assembly 100. As shown by curves B and C, sensor 210 converges to the desired operating temperature $T_d$ much more quickly than does sensor 110 of prior art transducer assembly 100.

In both transducers 100 and 200, the amount of heat transferred from the thermal shell to the sensor is a function of the difference between the temperatures of these two components. During warm up, the temperature difference between shell 216 and sensor 210 of transducer assembly 200 (as shown by the values of curves A and B at, for example, time $t_x$) is greater than the temperature difference between shell 116 and sensor 110 of prior art transducer assembly 100 (as shown by the difference between $T_d$ and curve C). Since this temperature difference is greater in transducer assembly 200, more heat is transferred from the thermal shell to the sensor when the sensor is warming up and sensor 210 therefore warms up more quickly than does sensor 110.

In alternative embodiments of the embodiment shown in FIG. 5, thermistors 262 and 264 are each separately coupled to controller 220b and controller 220b independently measures the temperature of each thermistor and then computes the average temperature $T_{Ave}$. However, it may be preferable to couple thermistors 262 and 264 in series between controller 220b and an electrical ground, since in this configuration, controller 220b may measure the average temperature $T_{Ave}$ simply by measuring the total series resistance of the two thermistors. In one such embodiment, thermistors 262 and 264 have substantially identical temperature coefficients and are linear over an operating range of temperatures so that the resistance of thermistor 262 ($R_{262}$) is substantially equal to a constant c times the temperature of thermistor 262 ($T_{262}$), and the resistance of thermistor 264 ($R_{264}$) is substantially equal to the constant c times the temperature of thermistor 264 ($T_{264}$). In this embodiment, controller 220b may measure the average temperature $T_{Ave}$ of thermistors 262, 264 simply by measuring the value of the total series resistance RT (i.e., $R_{262}$ plus $R_{264}$) and then dividing this value by two times the constant c, as is described by the formula shown in the following Equation (1):

$$R_T = R_{262} + R_{264} = c(T_{262} + T_{264}); \text{ and } T_{Ave} = \frac{R_T}{2c} \quad (1)$$

However, it may be preferable for the temperature coefficients of thermistors 262 and 264 to be different so that the average temperature $T_{Ave}$ measured by controller 220b is a weighted average of the temperatures of thermistors 262 and 264. For example, if $R_{262}$ is substantially equal to a first constant $c_1$ times $T_{262}$, and if $R_{264}$ is substantially equal to a second constant $c_2$ times $T_{264}$, then the total series resistance $R_T$ is equal to a weighted average of the temperatures as described by the formula shown in the following Equation (2):

$$R_T = R_{262} + R_{264} = c_1 T_{262} + c_2 T_{264} \quad (2)$$

Figure 7B:
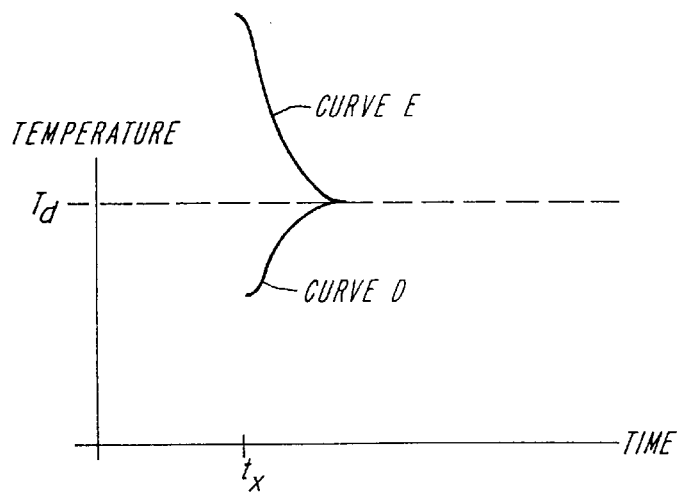

If the temperature coefficient of thermistor 262 is chosen to be greater than that of thermistor 264 (i.e., $c_1 > c_2$) then the average temperature $T_{Ave}$ measured by control unit 220 will be weighted so that when control unit 220 maintains the weighted average temperature $T_{Ave}$ equal to the desired operating temperature $T_d$, the difference between the temperature of thermal shell 216 and $T_d$ will be greater than the difference between $T_d$ and the temperature of sensor 210. FIG. 7B shows curves D and E, and these curves illustrate the temperatures of sensor 210 and thermal shell 216, respectively, as functions of time when the temperature coefficient of thermistor 262 is greater than that of thermistor 264. Skewing the temperature coefficients in this fashion causes increased heat transfer from thermal shell 216 to sensor 210 during warm up and therefore decreases the warm up time of transducer assembly 200. As those skilled in the art will appreciate, in other embodiments in which thermistors 262, 264 are not coupled in series and are instead independently coupled to controller 220b, controller 220b may compute a weighted average of the temperatures of sensor 210 and thermal shell 216 even if thermistors 262, 264 have identical temperature coefficients. Further, as those skilled in the art will appreciate, thermistors 262, 264 as well as all the other thermistors in transducer assembly 200 need not be implemented using thermistors, and rather may be implemented using any temperature sensitive device, such as, for example, resistive temperature devices (RTDs) or thermocouples.

During warm up of transducer assembly 200, control unit 220 controls heater 218 to apply heat to thermal shell 216 and also preferably controls auxiliary heater 260 (shown in FIG. 5) to apply heat directly to sensor 210. Control unit 220 preferably includes a controller 220d, such as a PID controller, for controlling heater 260 in response to the temperature of sensor 210 as sensed by thermistor 262. In one preferred mode of operation, controller 220d uses auxiliary heater 260 to apply a fixed amount of heat to sensor 210 during warm up. This may be accomplished, for example, by implementing controller 220d using a timer that activates auxiliary heater 260 for a fixed time period after an initial power up of transducer assembly 200 and then disables auxiliary heater 260 until the next power up. In this mode of operation, heater 218 and auxiliary heater 260 cooperate to heat sensor 210 until the temperature of sensor 210 approaches the desired operating temperature. Auxiliary heater 260 is then disabled and heater 218 alone is used to stabilize sensor 210 in thermal equilibrium.

Figure 7C:
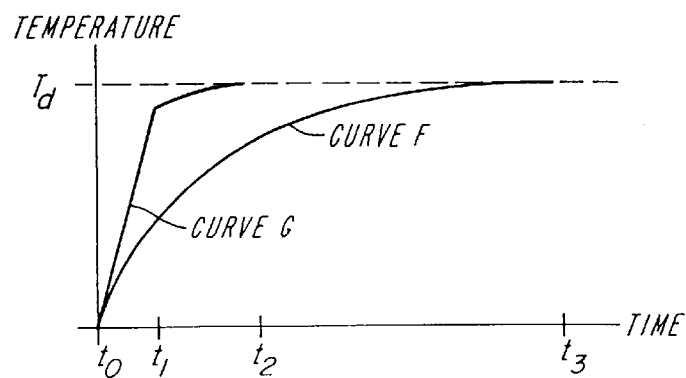

FIG. 7C shows two curves, curve F and curve G which illustrate the temperature of the sensor as a function of time during the warm up period of prior art transducer assembly 100 and transducer assembly 200, respectively. As stated above, prior art transducer assembly 100 is warmed up by heating thermal shell 116 to the desired operating temperature $T_d$ for as long as is required for the temperature of sensor 110 to climb from an initial temperature to the desired operating temperature $T_d$. As shown by curve F, if heater 118 is initially activated at initial time $t_0$ the temperature of sensor 110 gradually climbs until it reaches the desired operating temperature $T_d$ at a time $t_3$. So the warm up time for prior art transducer assembly 100 is the interval between $t_0$ and $t_3$. In transducer assembly 200, controller 220d activates auxiliary heater 260 between times $t_0$ and $t_1$ so as to apply a fixed amount of heat to sensor 210. As shown by curve G, in transducer assembly 200 the temperature of sensor 210 quickly approaches the desired operating temperature during the interval between $t_0$ and $t_1$ due to the additional heat provided by auxiliary heater 260. The power applied to auxiliary heater 260 may be supplied by an unregulated power source and even directly from a house power grid. At time $t_1$ controller 220d deactivates auxiliary heater 260 and thereafter controller 220b completes the warm up of sensor 210 by using heater 218 alone, so that between times $t_1$ and $t_2$ the temperature of sensor 210 converges to the desired operating temperature. So the warm up time of transducer assembly 200 is the interval between $t_0$ and $t_2$ and is considerably shorter than the warm up time of prior art transducer assembly 100.

This mode of operation in which control unit 220 activates auxiliary heater 260 for a fixed time and then disables auxiliary heater 260 thereafter is preferred because of its simplicity. However, in other preferred modes, controller 220d controls auxiliary heater 260 in response to a temperature measurement provided by thermistor 262 until the temperature of sensor 210 approaches a selected temperature. This selected temperature may be less than, or may even be equal to, the desired operating temperature of sensor 210. So controller 220d may activate auxiliary heater 260 during portions of the warm up period, or alternatively may activate auxiliary heater 260 during the entire warm up period, and even thereafter.

The warm up time of transducer assembly 200 may be thought of as including a first portion during which the temperature of sensor 210 is quickly increased to a selected temperature near (or equal to) the desired operating temperature $T_d$ and a second portion during which the sensor 210 achieves thermal equilibrium at $T_d$. Auxiliary heater 260 shortens the first portion of the warm up time by rapidly heating sensor 210 to the selected temperature, and use of the two thermistors 262, 264, shortens the second portion of the warm up time by accelerating the heat transfer from thermal shell 216 to sensor 210 when the temperature of sensor 210 is converging to $T_d$. Transducer assembly 200 may be implemented using only auxiliary heater 260 (and not thermistor 264), or may be implemented using only thermistors 262, 264 (and not auxiliary heater 260) and still provide a reduced warm up time. However, the preferred embodiment of transducer assembly 200 includes both auxiliary heater 260 and thermistor 264. In addition to auxiliary heater 260 and thermistors 262, 264, preferred embodiments of transducer assembly 200 further include tube-clamp 230 and tube-heater 232 (shown in FIG. 2A) as well as an integrally mounted control unit 220 and devices for controlling the temperature of control unit 220 independently from that of sensor 210 (such as in the vented embodiments shown in FIGS. 3–4 and a controller 220c shown in FIG. 5A for independently controlling the temperature of heater 244).

In another aspect, the present invention provides an improved thermal insulator that may be used for example to implement insulation 246 (shown in FIGS. 3 and 4). FIG. 8 shows a perspective view of a preferred embodiment of a multi-layered composite thermal insulator 246 constructed according to the invention. Composite insulator 246 includes a plurality of thermal radiation shield layers 310 and a plurality of spacer layers 312. The shield layers 310 and spacer layers 312 are loosely stacked one on top of another to form a multi-layered composite material with at least one spacer layer 312 preferably being disposed between each pair of adjacent radiation shield layers 310. Each layer of insulator 246 is characterized by a length L and a width W. The thicknesses of the shield layers 310 and the spacer layers 312 are equal to $T_1$ and $T_2$, respectively, and the overall thickness of composite insulator 246 (i.e., the sum of all the thicknesses of the individual layers 310, 312) is equal to $T_3$. As will be discussed in greater detail below, FIG. 8 is not drawn to scale, and the thicknesses $T_1$, $T_2$, and $T_3$ are normally much smaller relative to the length L and width W than is shown.

Each thermal radiation shield layer 310 is preferably characterized by a very low emissivity (e.g., 0.04) and is a good reflector of thermal radiation. In one preferred embodiment, each thermal radiation shield layer 310 is implemented using a metalized high temperature film. Such a shield layer may be constructed according to known techniques by depositing a thin layer of metal (e.g., aluminum) onto one or both major surfaces of a high temperature film. As used herein, the term high temperature film refers to a film that remains physically and structurally stable (i.e., the film does not shrink or melt) at high temperatures (e.g., up to 400° C.). Polyimide is one type of high temperature film that is preferred for use in constructing shield layer 310, and one type of preferred polyimide high temperature film is sold by Dupont under the tradename of KAPTON®. Metalized KAPTON® suitable for use as shield layers 310 is sold by Metalized Products, Inc., of Winchester, Mass. In one preferred embodiment, the thickness $T_1$ of each thermal radiation shield layer is about one thousandth of an inch, and the high temperature film accounts for the majority of this thickness with each metalization layer deposited on the film being only about one micron thick. In addition to being characterized by a very low emissivity, shield layers 310 are very flexible and may therefore be easily folded or shaped to fit inside any available volume where insulation is desired. While polyimide is a preferred material, those skilled in the art will appreciate that radiation shield layers 310 may alternatively be implemented using, for example, other types of metalized high temperature plastic films, or as metal foils.

Each spacer layer 312 is preferably characterized by a relatively low thermal conductivity and presents a high thermal resistance to both conductive and convective heat transfer. In one preferred embodiment, each spacer layer 312 is implemented using a non-woven E glass mat of the type available from Freudenberg Nonwovens Limited Partnership of Chelmsford, Mass. and sold for use as a "surfacing veil". In this embodiment, the thickness $T_2$ of each glass mat falls in a range of about eight to twelve thousandths of an inch, and one or more glass mats may be disposed between each adjacent pair of radiation shield layers 310. These mats are very flexible and may therefore be easily folded or shaped to fit in any volume where insulation is desired. Such non-woven E glass mats have been used for many years to provide physical strength to reinforced plastic structures. However, such mats have not heretofore been used as thermal insulators. The glass mat presents a high thermal resistance to thermal convection because the mat traps air between the glass fibers, and the mat presents a high thermal resistance to thermal conduction because the glass fibers are characterized by a low thermal conductivity. The glass mat also provides desirable high temperature characteristics since it is physically stable at very high temperatures (e.g., up to 840° C.). The glass mat is also advantageous since it is widely available and is inexpensive. While the glass mat is a preferred material, those skilled in the art will appreciate that the spacer layers 312 could alternatively be implemented using other relatively thin layers of materials that preferably (1) trap air and therefore provide a relatively high resistance to thermal convection; (2) are characterized by a relatively low thermal conductivity (e.g., a thermal conductivity of less than 0.07 W/m·° C., or Watts per meter times degrees Celsius); and (3) provide good high temperature characteristics (i.e., remain physically and structurally stable at high temperatures). Spacer layers 312 could therefore be constructed from, for example, woven and non-woven mats made from E glass as well as other types of glass, plastics, or other types of fibers. In other embodiments, spacer layers 312 could be constructed from layers of silicone rubber.

Since the radiation shield layers 310 are normally implemented using metalized films, they are generally characterized by a relatively high thermal conductivity. So if the spacer layers 312 were eliminated, insulator 246 would not be an effective thermal insulator. However, when the spacer layers 312 are included in insulator 246, the radiation shield layers 310 present a high thermal resistance to heat flowing through insulator 246 in the form of thermal radiation, and spacer layers 312 present a high thermal resistance to heat flowing through insulator 246 in the forms of thermal convection and conduction. Since the layers 310, 312 are loosely stacked to form insulator 246, the contact resistance, or the thermal resistance between any two adjacent layers, tends to be higher than the thermal resistance of the layers themselves. So, the multi-layered nature of insulator 246 tends to further increase the thermal resistance to heat flowing through insulator 246 in the form of conduction. It may be advantageous to include more than one spacer layer 312 between each adjacent radiation shield layer 310 since this substantially prevents any single fibers from extending between any two adjacent shield layers 310 and therefore further reduces the amount of heat conducted through insulator 246 via conduction. Also, the spacer layers tend to be less expensive than the radiation shield layers, so it may be more cost effective to include more than one spacer layer 312 between each adjacent radiation shield layer 310.

When shield layers 310 are implemented using aluminized polyimide films, and spacer layers 312 are implemented using the above-described non-woven E glass mat, and one mat is disposed between each polyimide film, composite insulator 246 provides a thermal conductivity that is about forty percent lower than that of silicone rubber (i.e., the conductivity of insulator 246 is 0.04 W/m·°C. at 120° C. while the conductivity of silicone rubber is 0.075 W/m·°C. at 120° C.). As stated above, even lower thermal conductivities may be achieved by including more than one spacer layer between each radiation shield layer. Since the layers of insulator 246 provide good high temperature properties (i.e., they remain physically and structurally stable at high temperatures), insulator 246 is useful at high temperatures (e.g., up to 400° C.). Further, since the spacer layers 312 present a high thermal resistance to convection as well as conduction, insulator 246 is useful in non-vacuum pressurized environments.

In one preferred embodiment of the pressure transducer assembly 200 shown in FIG. 4, the outer diameter of the thermal shell 216 is about two and a half inches, the height of thermal shell 216 is about three inches, and the gap between thermal shell 216 and lower enclosure 212d is approximately equal to five-eights of an inch. For use in this embodiment, sufficient radiation shield and spacer layers 310, 312 are loosely and alternately stacked, one on top of another, until the uncompressed thickness $T_3$ of insulator 246 is approximately equal to five-eights of an inch. Such an insulator 246 may be constructed using a single radiation shield layer 310 stacked on top of one or more spacer layers 312, where the width W of the layers 310, 312 is chosen to be about three inches so as to match the height of the thermal shell 216, and the length L of the layers 310, 312 is about seven feet. The layers 310, 312 are then continuously wound or wrapped around the thermal shell to form the multi-layered composite insulator 246 thick enough to fill the gap between the thermal shell 216 and the lower compartment 212d. Such an insulator may similarly be used between thermal shell 242 and upper enclosure 212e. Similar composite insulators 246 of any desired thickness may of course be constructed by layering a sufficient number of shields and spacer layers 310, 312.

While in the preferred embodiment, insulator 246 is constructed as a multi-layered composite as discussed above, in other embodiments insulator 246 may be constructed using other materials as a multi or single layer non-composite material. For example, in one embodiment, insulator 246 may be implemented using one or more layers of non-woven fabric constructed from aramid fibers. Aramid fibers are commercially available from Dupont and are sold under the tradename of KEVLAR®, and suitable aramid fiber fabrics for use as insulator 246 are commercially available from Textech of North Monmouth, Me. While these fabrics have been used in various applications such as in bullet proof vests, they have not heretofore been used as insulators. However, the inventors have discovered that these fabrics provide excellent high temperature characteristics (i.e., they remain physically stable at temperatures well above 150° C.), and that these fabrics are characterized by a relatively low thermal conductivity. Although the thermal conductivity of these fabrics is not as low as that of the above-described multi-layered composite insulator, it is lower than that of silicone rubber. So, these fabrics may advantageously be used in pressure transducer assemblies 200 to implement insulator 246. In still another embodiment, a composite insulator 246 may be constructed using an aramid fiber fabric for the spacer layers 312.

In yet another embodiment, insulator 246 may be implemented as a multi-layer stack of crinkled metalized polyester film sheets. One preferred polyester film for use in this embodiment is sold by Dupont under the tradename of MYLAR. Sheets of this polyester film are metalized and crinkled. Such metalized crinkled sheets are commercially available from Metalized Products, Inc., and are sold under the designation of NRC-2. When these sheets are loosely stacked one on top of another, the crinkles prevent adjacent sheets from contacting each other over large surface areas. Rather, adjacent sheets tend to contact each other only along the crinkle lines of one of the sheets. Each individual sheet presents a high resistance to thermal radiation, and due to the crinkled nature of the individual sheets, a stack of such sheets also presents a high resistance to thermal convection and conduction. Since polyesters only tend to remain physically stable up to temperatures of 150° C., insulators made from stacks of such crinkled metalized polyester film sheets are suitable for use in lower temperature (e.g., 100° C.) pressure transducer assemblies and may not be suitable for use in higher temperature transducer assemblies.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. A pressure transducer assembly comprising:

(A) an external enclosure defining an interior cavity;

(B) a thermal shell, disposed within said interior cavity, for defining a sensor cavity;

(C) a pressure sensor, disposed within said sensor cavity, and including an input port for receiving a gas or vapor, for sensing the pressure of the gas or vapor at the input port as a function of a parameter value that varies according to the pressure of the gas or vapor at said input port;

(D) means for coupling a source of said gas or vapor to said input port;

(E) temperature control means for applying heat to and controlling the temperature of said thermal shell;

(F) a thermal insulator disposed between said external enclosure and said thermal shell, said thermal insulator including:

(i) a plurality of metalized high temperature films stacked one on top of another; and (ii) a plurality of spacer layers, each of said spacer layers being disposed between adjacent ones of said metalized high temperature films.

2. An assembly according to claim 1, wherein one or more of said spacer layers comprises a non-woven glass mat.

3. An assembly according to claim 1, wherein one or more of said spacer layers comprises a non-woven E glass mat.

4. An assembly according to claim 1, wherein one or more of said spacer layers comprises aramid fibers.

5. An assembly according to claim 1, wherein one or more of said spacer layers comprises silicone rubber.

6. An assembly according to claim 1, wherein one or more of said high temperature films comprises polyimide.

7. An assembly according to claim 1, wherein one or more of said high temperature films comprises aluminized polyimide.

8. A pressure transducer assembly comprising:
(A) an external enclosure defining an interior cavity;
(B) a thermal shell, disposed within said interior cavity, for defining a sensor cavity;
(C) a pressure sensor, disposed within said sensor cavity, and including an input port for receiving a gas or vapor, for sensing the pressure of the gas or vapor at the input port as a function of a parameter value that varies according to the pressure of the gas or vapor at said input port;
(D) means for coupling a source of said gas or vapor to said input port;
(E) temperature control means for applying heat to and controlling the temperature of said thermal shell;
(F) a thermal insulator disposed between said external enclosure and said thermal shell, said thermal insulator comprising aramid fibers.

9. A pressure transducer assembly comprising:
(A) an external enclosure defining an interior cavity;
(B) a thermal shell, disposed within said interior cavity, for defining a sensor cavity;
(C) a pressure sensor, disposed within said sensor cavity, and including an input port for receiving a gas or vapor, for sensing the pressure of the gas or vapor at the input port as a function of a parameter value that varies according to the pressure of the gas or vapor at said input port;
(D) means for coupling a source of said gas or vapor to said input port;
(E) temperature control means for applying heat to and controlling the temperature of said thermal shell;
(F) a thermal insulator disposed between said external enclosure and said thermal shell, said thermal insulator comprising a plurality of crinkled metalized plastic sheets.

10. An assembly according to claim 9, wherein one or more of said plastic sheets comprises polyester.

11. An assembly according to claim 9, wherein one or more of said metalized plastic sheets comprises aluminized polyester.

12. A pressure sensor comprising:
(A) a diaphragm;
(B) a flange defining a first principal face, a second principal face, and a bore extending through said flange from said first principal face to said second principal face, at least a portion of said bore being characterized by an inner perimeter;
(C) a hollow tube extending from a first end to a second end, said first end being characterized by an outer perimeter substantially equal to said bore inner perimeter, said tube including a first thinned region proximal to said first end and characterized by an outer perimeter smaller than said bore inner perimeter;
(D) means for affixing said tube to said flange, said first end being disposed inside said bore, said first thinned region extending through at least a portion of said bore, and said tube extending beyond said first principal face; and
(E) means for affixing said diaphragm to said flange second principal face so that at least a portion of said diaphragm may be displaced in response to gas or vapor pressure in said hollow tube.

13. A sensor according to claim 12, further including an electrode spaced apart from said diaphragm, said electrode and said diaphragm forming a variable capacitor, the capacitance provided by said variable capacitor being representative of the position of said diaphragm.

14. A sensor according to claim 13, wherein said capacitance is representative of the gas or vapor pressure in said hollow tube.

15. A pressure transducer assembly, comprising:
(A) a pressure sensor including:
(i) a diaphragm;
(ii) a flange defining a first principal face, a second principal face, and a bore extending through said flange from said first principal face to said second principal face, at least a portion of said bore being characterized by an inner perimeter;
(iii) a hollow tube extending from a first end to a second end, said first end being characterized by an outer perimeter substantially equal to said bore inner perimeter, said tube including a first thinned region proximal to said first end and characterized by an outer perimeter smaller than said bore inner perimeter;
(iv) means for affixing said tube to said flange, said first end being disposed inside said bore, said first thinned region extending through at least a portion of said bore, and said tube extending beyond said first principal face; and
(v) means for affixing said diaphragm to said flange second principal face so that at least a portion of said diaphragm may be displaced in response to gas or vapor pressure in said hollow tube; and
(B) an external enclosure defining an interior cavity within said external enclosure, said diaphragm and said flange and a portion of said tube being disposed in said interior cavity, said external enclosure defining a first aperture in said external enclosure, said hollow tube extending through said first aperture so that said second end of said hollow tube is disposed outside said interior cavity.

16. An assembly according to claim 15, further including a thermal shell disposed within said interior cavity for defining a sensor cavity, said diaphragm and said flange and a portion of said tube being disposed in said sensor cavity, said thermal shell defining a second aperture, said hollow tube extending through said second aperture.

17. An assembly according to claim 16, further including means for heating said thermal shell.

18. An assembly according to claim 15, said pressure sensor further including an electrode spaced apart from said diaphragm, said electrode and said diaphragm forming a variable capacitor, the capacitance provided by said variable capacitor being representative of the position of said diaphragm.

19. An assembly according to claim 18, wherein said capacitance is representative of the gas or vapor pressure in said hollow tube.

20. An assembly according to claim 19, further comprising means for sensing said capacitance and for generating a signal representative of said capacitance.

21. A pressure transducer assembly comprising:
   (A) an external enclosure defining an interior cavity within said external enclosure, said external enclosure further defining a first aperture in said external enclosure;
   (B) a thermal shell comprising copper and defining a sensor cavity within said thermal shell, said thermal shell further defining a second aperture in said thermal shell, said thermal shell being disposed within said interior cavity;
   (C) a pressure sensor, disposed within said sensor cavity, and including an input port for receiving a gas or vapor, for sensing the pressure of the gas or vapor at the input port as a function of a parameter value that varies according to the pressure of the gas or vapor at said input port;
   (D) a tube for defining a conduit for the vapor or gas to said input port of said sensor, said tube extending through said first and second apertures and having a first end coupled to the input port of the sensor and a second end positioned outside the external enclosure;
   (E) first temperature control means for applying heat to and controlling the temperature of said thermal shell;
   (F) a thermal insulator disposed between said external enclosure and said thermal shell; and
   (G) means for sensing said parameter value and generating therefrom a transducer output signal representative of said pressure at said input port.

22. An assembly according to claim 21, wherein said thermal insulator comprises:
   (A) a plurality of metalized high temperature films stacked one on top of another; and
   (B) a plurality of spacer layers, each of said spacer layers being disposed between adjacent ones of said metalized high temperature films.

23. An assembly according to claim 21, further comprising second temperature control means for controlling the temperature of said sensing means.

24. An assembly according to claim 21, further comprising second temperature control means for controlling the temperature of said tube, said second temperature control means including means, proximal to and in thermal contact with at least a portion of the section of the tube extending between said first end and said first aperture, for providing heat transfer with said tube.

25. An assembly according to claim 21, further comprising auxiliary heater means disposed in said sensor cavity proximal to said sensor for heating said sensor.

* * * * *